(12) United States Patent
Hayakawa

(10) Patent No.: US 10,565,482 B1
(45) Date of Patent: Feb. 18, 2020

(54) IMAGE PROCESSING SYSTEM

(71) Applicant: FUJI XEROX CO., LTD., Tokyo (JP)

(72) Inventor: Michio Hayakawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/387,638

(22) Filed: Apr. 18, 2019

(30) Foreign Application Priority Data

Nov. 19, 2018 (JP) ................................. 2018-216614

(51) Int. Cl.
| | | |
|---|---|---|
| *G06K 15/02* | (2006.01) | |
| *H04N 1/00* | (2006.01) | |
| *G06F 3/12* | (2006.01) | |

(52) U.S. Cl.
CPC ....... *G06K 15/1863* (2013.01); *G06F 3/1237* (2013.01); *H04N 1/00167* (2013.01)

(58) Field of Classification Search
CPC .............. G06K 15/1863; G06F 3/1237; H04N 1/00167; H04N 1/00196–00201
See application file for complete search history.

(56) References Cited

U.S. PATENT DOCUMENTS 7,839,540 B2   11/2010   Nishide et al.

FOREIGN PATENT DOCUMENTS

| JP | 4608837 B2 | 1/2011 |
| JP | 2015-188212 A | 10/2015 |
| JP | 6135329 B2 | 5/2017 |

*Primary Examiner* — Christopher Wait
(74) *Attorney, Agent, or Firm* — Oliff PLC

(57) ABSTRACT

An image processing system includes first and second devices. The first device converts print data described in a page description language into intermediate data. The second device converts the intermediate data into raster data and supplies the raster data to a printer. The first device includes a shape modifier, a first generator, and an output section. The shape modifier divides plural graphic elements indicated by the intermediate data within a unit of output into groups, and modifies, among the graphic elements in each of the groups, a shape of first-type graphic elements having a specific component into a shape without having an overlapping portion between the first-type graphic elements. A color of the specific component is superimposed on a color of an underlying graphic element. The first generator generates an item of mask information for identifying a logical OR shape of the first-type graphic elements included in each of the groups. The output section outputs the plural graphic elements, and outputs the first-type graphic elements having the modified shape in each of the groups so that the first-type graphic elements in the individual groups are output, together with the associated items of mask information, in reverse order of an order in which the individual groups are arranged within the unit of output. The second device includes a mask storage, an graphic storage, and a renderer. The mask storage stores the items of mask information. The graphic storage stores a graphic of the unit of output. Upon receiving an item of the mask information from the output section, the renderer adds the item of the mask information to the mask storage. Then, upon receiving a first-type graphic element from the output section, the renderer masks the first-type graphic element with the logical OR shape identified by the items of mask information stored in the mask storage, and then writes a graphic of the masked first-type graphic element into the graphic storage.

9 Claims, 17 Drawing Sheets

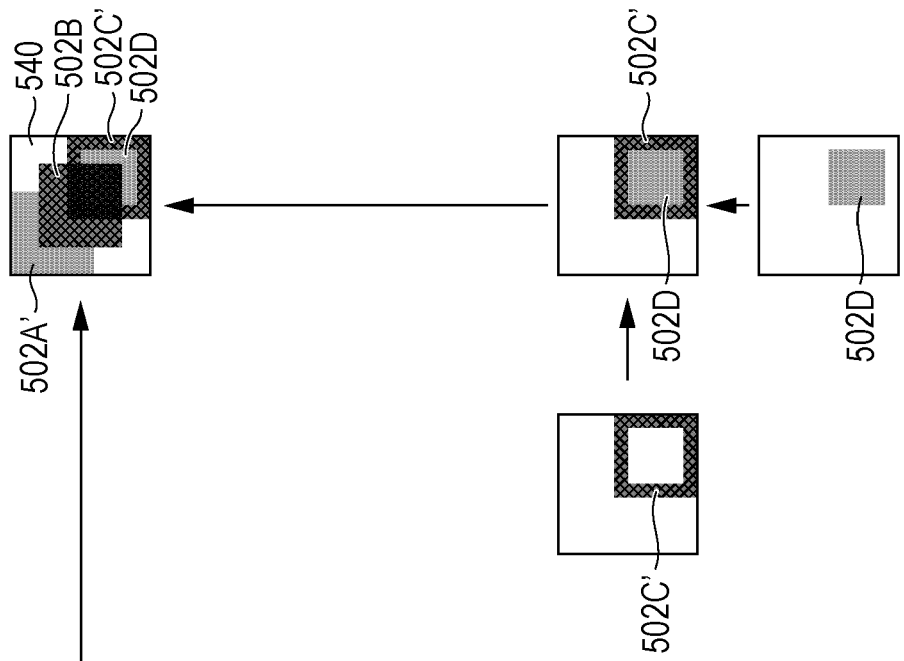
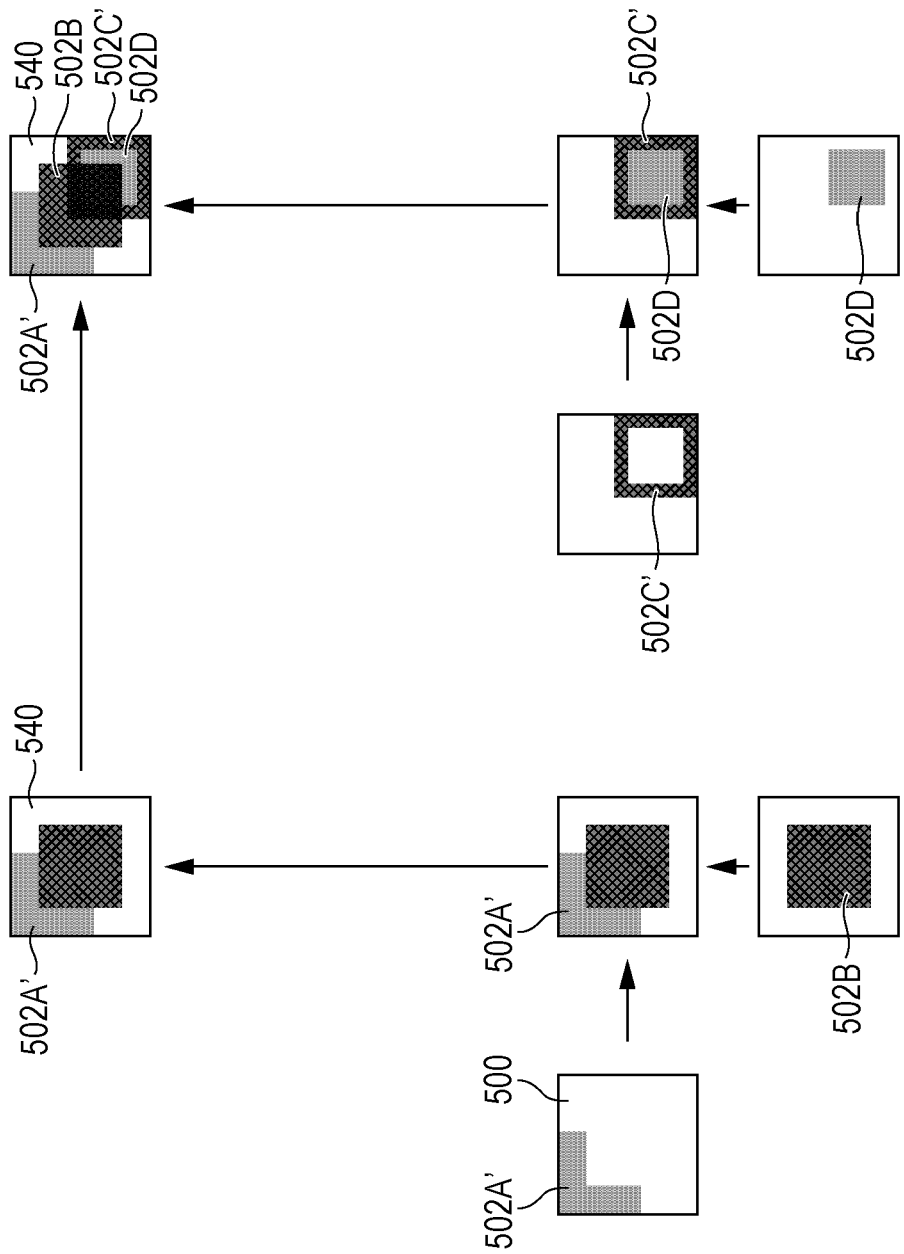

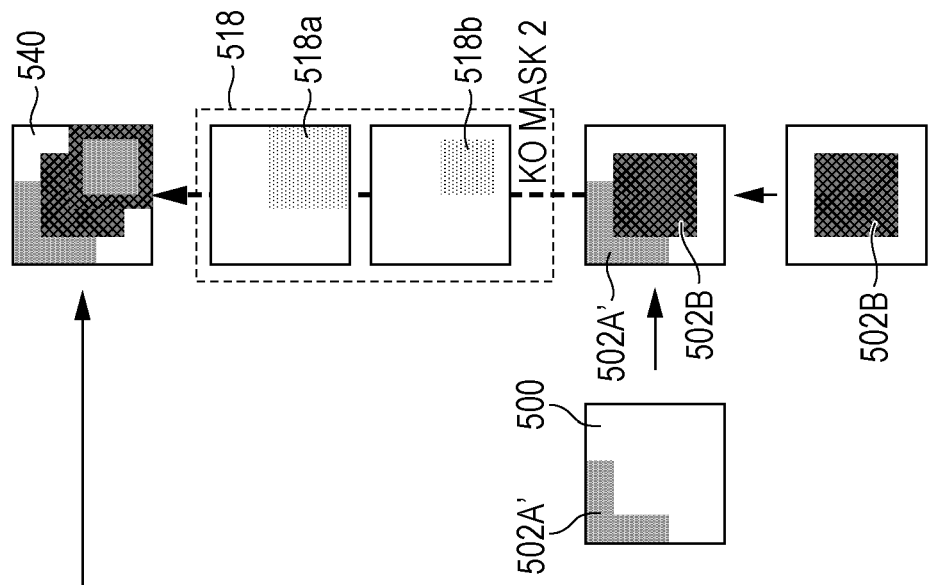
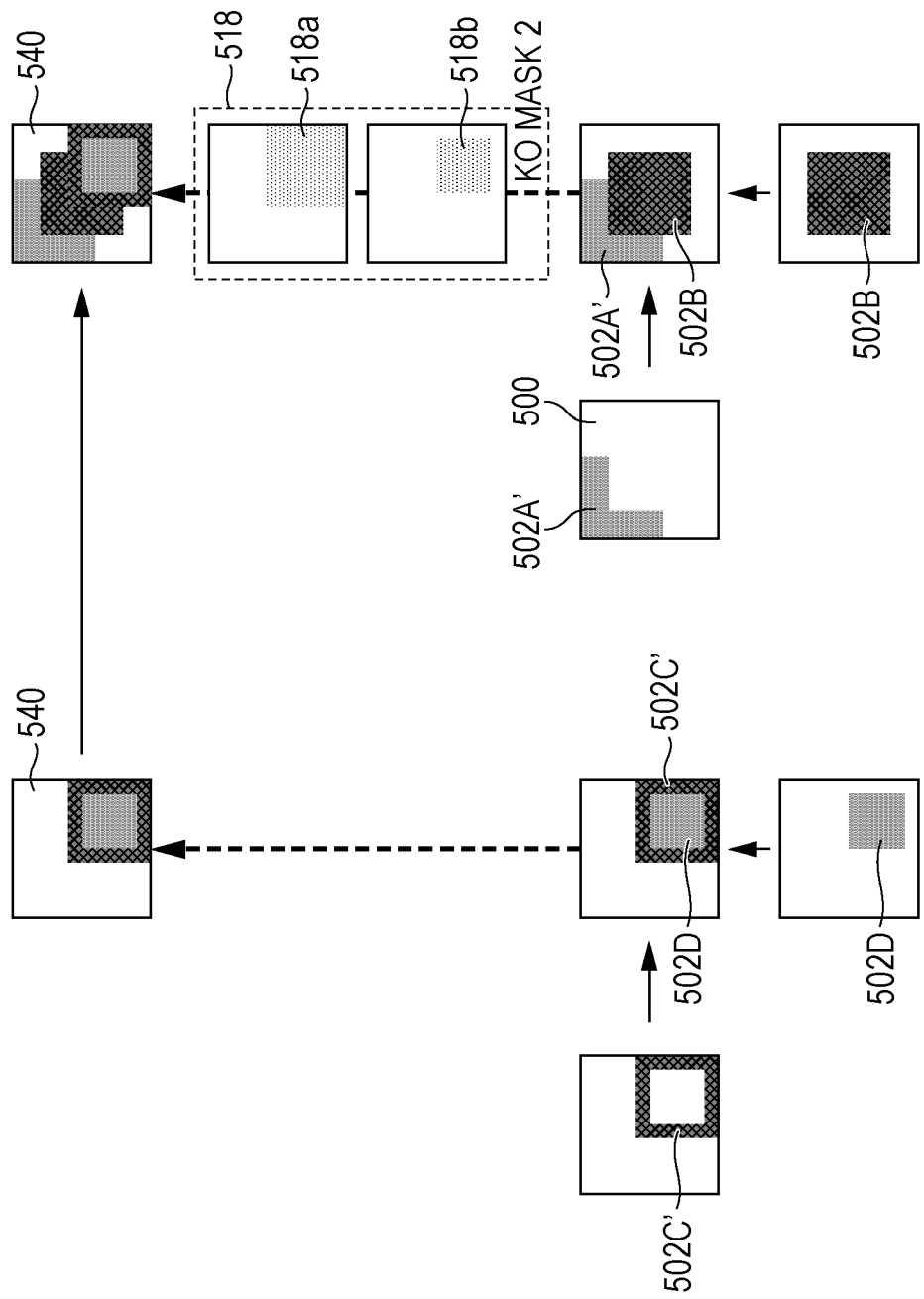

IMAGE PROCESSING SYSTEM

CROSS-REFERENCE TO RELATED APPLICATIONS

This application is based on and claims priority under 35 USC 119 from Japanese Patent Application No. 2018-216614 filed Nov. 19, 2018.

BACKGROUND

(i) Technical Field

The present disclosure relates to an image processing system.

(ii) Related Art

Japanese Unexamined Patent Application Publication No. 2015-188212 discloses an apparatus that executes processing so that the color of a portion at which objects of a specific channel overlap each other becomes the same color as that when a bitmap image of this specific channel is created first and is then combined with an object of another channel. In this apparatus, an object color separator receives intermediate data objects which are input sequentially in the rendering order, and separates each of the objects into a basic color object constituted by only basic color components and a spot color object constituted by only a corresponding spot color component. The separated basic color object and the spot color object have the same shape of the original object. The object color separator outputs the basic color object to a subsequent device and stores the spot color object in a corresponding spot color spool. When storing this spot color object, the object color separator causes the shape of this spot color object to eclipse the shape of another spot color object already stored in the spot color spool. Every time the object color separator finishes processing on all objects for one page, it outputs the objects stored in the individual spot color spools to the subsequent device in accordance with the superimposing order of the spot color channels after simulating the spot color components by the basic colors.

Japanese Patent No. 4608837 discloses the following method. After configuring page settings, a print server extracts a spot color name based on a rendering command, comments for image data, and job code for each page (page layout), and creates a list in which the spot color names and the individual pages are associated with each other. Then, the print server performs channel separation processing and raster image processor (RIP) processing for each page so as to generate raster data of each of CMYK colors and raster data of the spot color corresponding to a certain spot color name. The print server then combines the raster data of the spot color with the raster data of each of the CMYK colors based on the CMYK values corresponding to the spot color name, and outputs the combined raster data. According to this method, the correct color of a spot color object overprinted on another object is reproduced.

Japanese Patent No. 6135329 discloses the following apparatus. Upon receiving intermediate data of a new object, an optimizing processor executes the following processing on objects stored in a spool prior to the new object in the rendering order. If an object stored in the spool is completely hidden by this new object, the optimizing processor deletes the stored object. If an object stored in the spool is partially hidden by the new object, the optimizing processor modifies the shape of the stored object by removing the hidden portion. The optimizing processor then stores the new object in the spool. Every time the optimizing processor finishes processing on an object group included in the unit of output, such as a page, it outputs data of this object group stored in the spool.

SUMMARY

A first device converts print data into intermediate data, and a second device generates raster data from intermediate data. The first device modifies the shape of a group of first-type graphic elements having a specific component, such as a spot color, which is superimposed on the color of an underlying component, so that the first-type graphic elements do not overlap each other. The first device then outputs the group of first-type graphic elements to the second device. Modifying the shape of a group of first-type graphic elements in the above-described approach is effective if it is known how the first-type graphic elements overlap each other when the first device generates intermediate data of each of the graphic elements. The overlapping portion of the first-type graphic elements is eliminated. As a result, multiple superimposing of the color of the specific component is not observed in the image of rendering data.

However, there is a case in which it is still unknown how a first-type graphic element overlaps another element when the first device generates intermediate data of this graphic element. For example, regarding a first-type graphic element to be cached in a cache and reused later, it is unknown how it will overlap another object until it is actually rendered. Accordingly, the above-described approach is not applicable to such a case.

Aspects of non-limiting embodiments of the present disclosure relate to a mechanism for avoiding multiple superimposing of the color of a specific component caused by overlapping of first-type graphic elements even when it is still unknown how first-type graphic elements overlap each other when the first device generates intermediate data of the graphic elements.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing system including first and second devices. The first device converts print data described in a page description language into intermediate data. The second device converts the intermediate data into raster data and supplies the raster data to a printer. The first device includes a shape modifier, a first generator, and an output section. The shape modifier divides plural graphic elements indicated by the intermediate data within a unit of output into groups, and modifies, among the graphic elements in each of the groups, a shape of first-type graphic elements having a specific component into a shape without having an overlapping portion between the first-type graphic elements. A color of the specific component is superimposed on a color of an underlying graphic element. The first generator generates an item of mask information for identifying a logical OR shape of the first-type graphic elements included in each of the groups. The output section outputs the plural graphic elements, and outputs the first-type graphic elements having the modified shape in each of the groups so that the first-type graphic elements in the individual groups are output, together with the associated items of mask information, in reverse order of an order in which the individual groups are arranged within the unit of output. The second device includes a mask storage, a graphic storage, and a renderer. The mask storage stores the items of mask information. The graphic storage stores a graphic of the unit of output. Upon receiving an item of the mask information from the output section, the renderer adds the item of the mask information to the mask storage. Then, upon receiving a first-type graphic element from the output section, the renderer masks the first-type graphic element with the logical OR shape identified by the items of mask information stored in the mask storage, and then writes a graphic of the masked first-type graphic element into the graphic storage.

BRIEF DESCRIPTION OF THE DRAWINGS

Exemplary embodiments of the present disclosure will be described in detail based on the following figures, wherein:

FIGS. 15A and 15B illustrate an example of processing executed by the renderer to discuss an issue of the related art;

FIGS. 17A and 17B illustrate an example of processing executed by the renderer according to the fourth exemplary embodiment.

DETAILED DESCRIPTION

Figure 1:
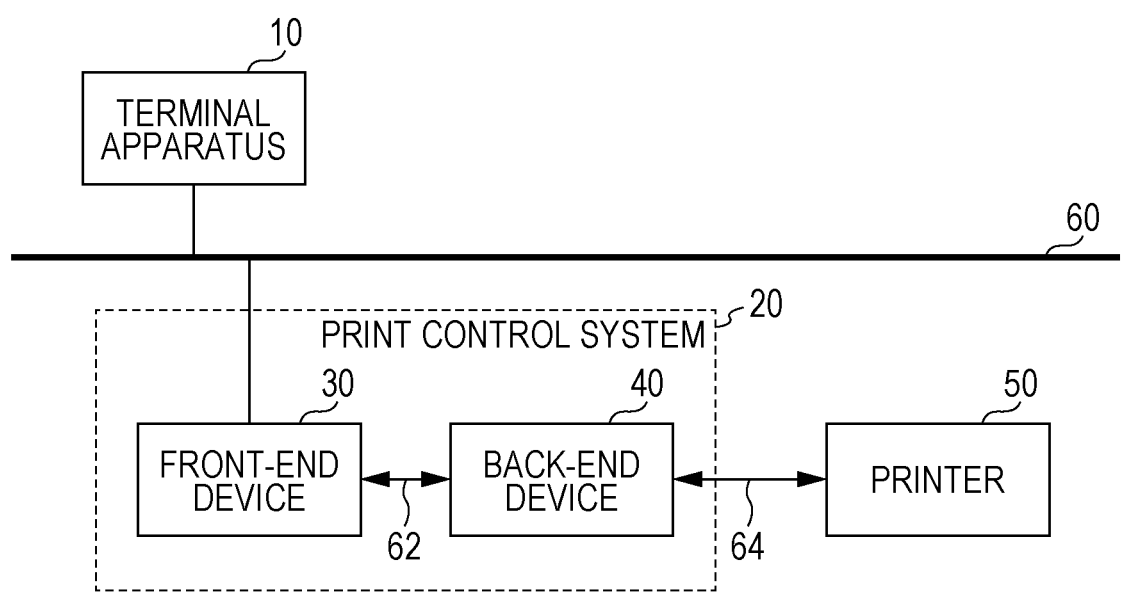
FIG. 1 is a block diagram illustrating an example of the configuration of an image processing system.

First Exemplary Embodiment: Application Example to Caching of Spot Color Objects FIG. 1 is a block diagram illustrating an example of the configuration of an image processing system. The image processing system includes a terminal apparatus 10, a print control system 20, and a printer 50. The print control system 20 includes a front-end device 30 and a back-end device 40. The terminal apparatus 10 is connected to the front-end device 30 via a communication medium 60, and sends a print job including a document print command to the front-end device 30 in accordance with an instruction from a user. The front-end device 30 is connected to the back-end device 40 via a communication medium 62, and the back-end device 40 is connected to the printer 50 via a communication medium 64.

The communication media 60, 62, and 64 may be data communication networks, such as local area networks (LANs). The communication media 60, 62, and 64 may be a shared communication medium or may be different communication media. For example, a LAN may be used as the communication medium 60 between the terminal apparatus 10 and the front-end device 30, and a dedicated communication medium different from a LAN may be used as the communication medium 62 between the front-end device 30 and the back-end device 40 and as the communication medium 64 between the back-end device 40 and the printer 50.

In the image processing system shown in FIG. 1, a print job sent from the terminal apparatus 10 is processed in the front-end device 30, and data indicating a processing result is sent to the back-end device 40. Then, rendering data (also called raster data) is generated in the back-end device 40 and is sent to the printer 50. The printer 50 then performs printing in accordance with the rendering data.

Each of the front-end device 30 and the back-end device 40 may be operated independently and in parallel. For example, three front-end devices 30 may be operated in parallel, and four back-end devices 40 may be operated in parallel. The number of front-end devices 30 and that of the back-end devices 40 may suitably be determined in accordance with the usage mode of this system.

The terminal apparatus 10, the front-end device 30, and the back-end device 40 shown in FIG. 1 may be implemented by a general-purpose computer, for example. In a circuit configuration of the computer, hardware devices, such as a central processing unit (CPU), a memory (primary storage), various input-output (IO) interfaces, and a communication interface, are connected to each other via a bus. The computer sends and receives data to and from other devices via the communication interface. Input devices, such as a keyboard and a mouse, and a display device, such as a cathode ray tube (CRT) or a liquid crystal display, are connected to the bus via an IO interface. A fixed secondary storage device, such as a hard disk drive (HDD) or a solid state drive (SSD), and a disk drive for reading portable non-volatile recording media of various standards, such as a digital versatile disc (DVD) and a flash memory, are connected to the bus via an IO interface. Such a disk drive serves as an external storage device for the memory. A program describing the content of processing in exemplary embodiments, which will be discussed below, is stored in a fixed storage device, such as an HDD, through the use of a recording medium, such as a compact disc (CD) or a DVD, or via a network, and is installed into the computer. As a result of the CPU reading the program stored in the fixed storage device into the memory and executing the program, the processing in the exemplary embodiments is implemented.

In the exemplary embodiments, some functions of the back-end device 40 may be implemented, not by software processing by executing the program, but by hardware processing. Hardware processing may be performed by using a dynamic reconfigurable processor (DRP) in which a circuit is dynamically reconfigurable while processing is being executed. Alternatively, hardware processing may be performed by using a circuit, such as an application specific integrated circuit (ASIC). For example, a hardware element, such as a DRP or an ASIC, that executes some functions of the back-end device 40 is configured in advance, and then, it is connected to the bus of a general-purpose computer, thereby implementing the back-end device 40.

One specific example of hardware that implements the front-end device 30 and the back-end device 40 is a blade server. A blade server is constituted by plural information processing apparatuses, which each function as a server, loaded in a housing. More specifically, a blade server is the following server device. A general-purpose computer including a CPU, a memory, and so on, is mounted on a single substrate (blade) and plural blades are loaded in a housing. For example, one blade loaded in the blade server may be used as the front-end device 30, and another blade may be used as the back-end device 40. Alternatively, each of the front-end device 30 and the back-end device 40 may be implemented by plural blades loaded in the blade server.

The above-described specific example is only an example, and each of the front-end device 30 and the back-end device 40 may be constructed in an individual computer loaded in an individual housing. Alternatively, the front-end device 30 and the back-end device 40 may be constructed in the same computer. That is, a program for executing processing of the front-end device 30 and that of the back-end device 40 may be executed in the same computer.

The printer 50 is a device that prints an image on a medium, such as paper. The printer 50 may be a continuous-paper printer or a cut-sheet printer. The printing method of the printer 50 is not restricted to a specific one, and may be an electrophotographic system, an inkjet method, or another method.

Figure 2:
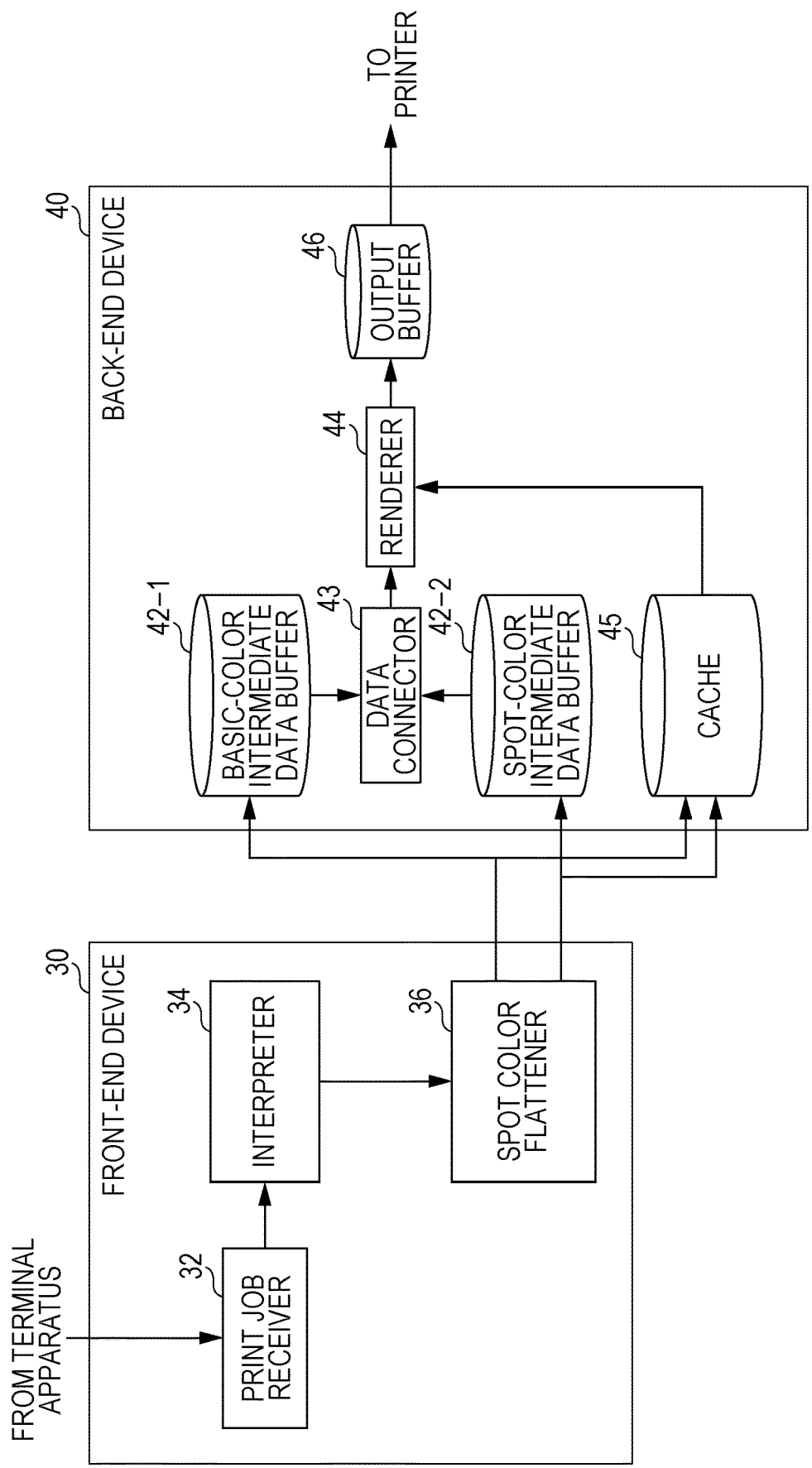
FIG. 2 is a block diagram illustrating an example of the functional configurations of a front-end device and a back-end device of a print control system.

FIG. 2 illustrates an example of the functional configurations of the front-end device 30 and the back-end device 40 of the print control system 20. The front-end device 30 includes a print job receiver 32, an interpreter 34, and a spot color flattener 36. The back-end device 40 includes a basic-color intermediate data buffer 42-1, a spot-color intermediate data buffer 42-2, a data connector 43, a renderer 44, a cache 45, and an output buffer 46.

The print job receiver 32 of the front-end device 30 receives a print job from the terminal apparatus 10. In the exemplary embodiments, a print job includes a command to print a certain document and data indicating this document described in a page description language (PDL). A PDL is a computer programming language for causing an information processing apparatus to perform display processing, print processing, and so on. Examples of PDL are PostScript (registered trademark) and portable document format (PDF) (registered trademark). Data described in PDL indicates position information, format information, and color information concerning objects such as characters, drawings, and images (bitmap images) forming a document to be printed. Hereinafter, data indicating a document described in PDL will be called PDL data. The print job receiver 32 supplies PDL data included in a received print job to the interpreter 34.

The interpreter 34 interprets the PDL data received from the print job receiver 32, and generates intermediate data including an instruction about a procedure for generating rendering data in accordance with interpreting results. The interpreter 34 then outputs the generated intermediate data to the spot color flattener 36. Rendering data is print image data indicating an image to be printed expressed in a format that can be handled by the printer 50. Raster data is an example of rendering data. Intermediate data is data having a granularity level between PDL data and rendering data. According to the intermediate data format, each image object described in PDL is further divided into smaller elements having a simple configuration. Examples of the intermediate data format are a display list format and the format described in Japanese Unexamined Patent Application Publication No. 2015-188212.

The same resolution and the same color space as those of the printer 50 may be set for the intermediate data. This eliminates the need for the renderer 44 of the back-end device 40 to convert the resolution and the color space. The intermediate data may be provided for each of color channels (for example, CMYK channels), or may be expressed in a composite format in which plural items of data concerning multiple color channels are integrated.

As a result of interpreting PDL data, the interpreter 34 divides each object represented by the PDL data into unit shapes (for example, the shape in a rectangle format, a run format, or a raster mask format) to be used in the intermediate data format, and generates data indicating the shape and the color of each unit shape. This data represents an object in the intermediate data format.

The spot color flattener 36 receives intermediate data sequentially output from the interpreter 34, and outputs basic color components of the intermediate data to the basic-color intermediate data buffer 42-1 of the back-end device 40. The spot color flattener 36 performs flattening processing on spot color components of the intermediate data and converts them into basic color components (spot color simulations). In this manner, when intermediate data is represented by basic color components and spot color components, the spot color flattener 36 separates the basic color components and the spot color components from each other and outputs the basic color components to the basic-color intermediate data buffer 42-1 and executes flattening processing on the spot color components. When performing flattening, the spot color flattener 36 executes processing for converting the color of overlapping objects having the same spot color component into a color unique to this spot color component (not into a color resulting from superimposing of the same spot color component). The spot color flattener 36 also executes processing so that an object including a spot color component can be stored in the cache 45 and reused. The spot color flattener 36 outputs the flattening results of the spot color components to the spot-color intermediate data buffer 42-2 of the back-end device 40.

The spot color flattener 36 also outputs the intermediate data of an object to be cached to the cache 45 of the back-end device 40. In this case, the spot color flattener 36 executes the above-described flattening processing on the intermediate data of a spot color component included in the object to be cached.

An overview of the front-end device 30 has been discussed. Details of processing executed by the spot color flattener 36 will be discussed later.

In the back-end device 40, the basic-color intermediate data buffer 42-1 is a buffer storing intermediate data represented by basic color components, while the spot-color intermediate data buffer 42-2 is a buffer storing intermediate data represented by spot color components. The cache 45 stores intermediate data of objects to be cached.

The data connector 43 connects intermediate data stored in the basic-color intermediate data buffer 42-1 and that in the spot-color intermediate data buffer 42-2 with each other, and supplies them to the renderer 44. The data connector 43 supplies intermediate data of each unit of output (for each page, for example). More specifically, the data connector 43 first supplies intermediate data of an object group of the unit of output stored in the basic-color intermediate data buffer 42-1 to the renderer 44, and then, supplies intermediate data of an object group of the unit of output stored in the spot-color intermediate data buffer 42-2 to the renderer 44.

The renderer 44 performs rendering (rasterizing) processing on the intermediate data of objects sequentially supplied from the data connector 43 and generates rendering data (raster data). For example, the renderer 44 may perform rendering of an object in the following manner. From the color data of this object, the renderer 44 determines the value of each of the pixels within a range indicated by the shape data of the object, and writes the determined pixel values into addresses of a page memory associated with the pixels of this object. By performing rendering of all objects included in one page, a raster image (rendering data) of this page is generated.

If intermediate data supplied from the data connector 43 includes a command to reference an object stored in the cache 45, the renderer 44 obtains this object from the cache 45 when executing this command and performs rendering of this object. If intermediate data supplied from the data connector 43 is a mask, the renderer 44 executes processing for applying this mask to the subsequent intermediate data when performing rendering on this intermediate data.

A real object output from the data connector 43 to the renderer 44 is an object included in print data in the intermediate data format. In contrast, a real object stored in the cache 45 to be referenced by a reference object is an external object as viewed from the print data.

The generated rendering data of each page is stored in the output buffer 46, and items of rendering data stored in the output buffer 46 are sequentially read by the printer 50. The printer 50 prints an image corresponding to the rendering data of each page on paper.

An example of the issue which arises when executing processing for caching a spot color object in the cache 45 and reusing it without performing certain preparatory processing in the front-end device 30 will be discussed below with reference to FIGS. 3 through 4D. This example discusses an issue which occurs when a spot color object is cached and reused in accordance with processing (eclipse processing) using a spot color spool disclosed in Japanese Unexamined Patent Application Publication No. 2015-188212.

Figure 3:
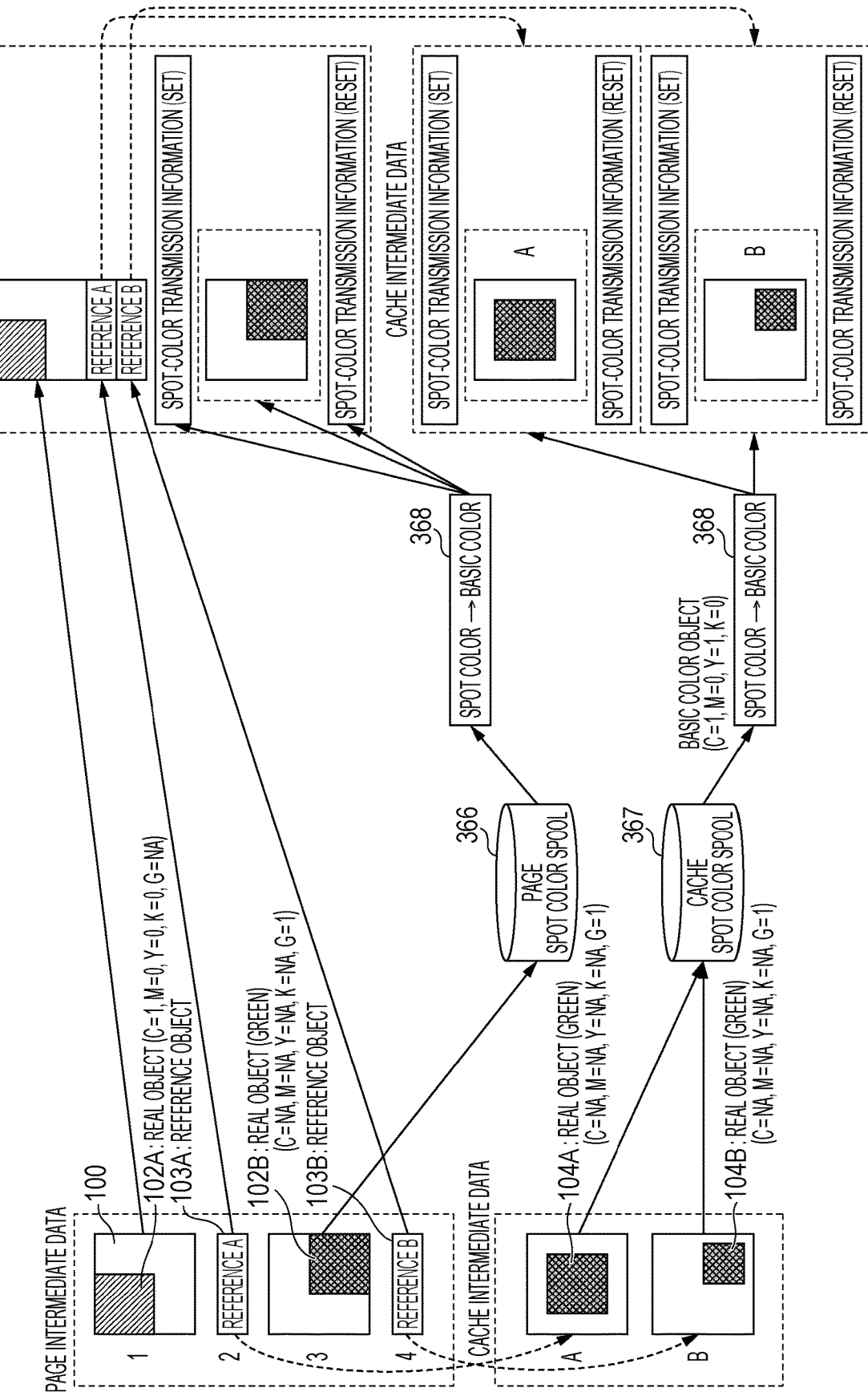
FIG. 3 illustrates an example of processing executed by a spot color flattener to discuss an issue of the related art.
Figure 4:
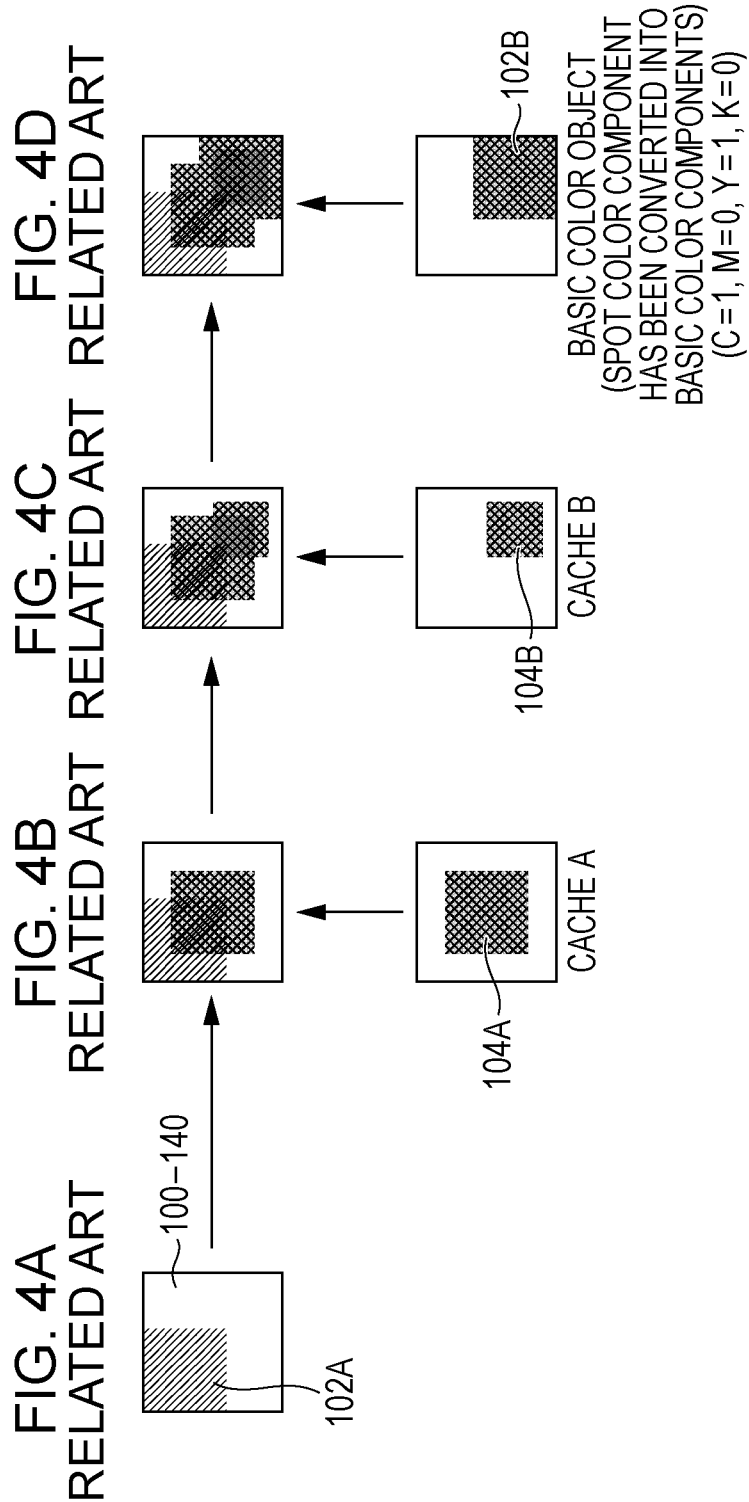
FIGS. 4A through 4D illustrate an example of processing executed by a renderer to discuss an issue of the related art.

FIG. 3 illustrates a specific example of processing executed in the front-end device 30. Page intermediate data shown on the top left side of FIG. 3 is input into the spot color flattener 36. The page intermediate data indicates a real object 102A, a reference object 103A, a real object 102B, and a reference object 103B within a page 100. These four objects are sequentially input into the spot color flattener 36 in order in the top-bottom direction in FIG. 3. In this example, it is assumed that an instruction to perform knock-out processing is specified in the real objects 102A and 102B and that only one spot color, that is, green (G), is used.

A real object is an object having an actual image (that is, an object including an actual rendering command, which is not a reference command). The color of the real object 102A is (C, M, Y, K, G)=(1, 0, 0, 0, NA) (NA means "not applicable" and indicates that this color component has no value). This object does not contain the spot color (G).

A reference object is an object which references a cached real object (will be called a cache object), and includes identification information concerning a cache object to be referenced by this reference object. The reference object 103A references a real object 104A, which is a cache object.

The color of the real object 102B is (C, M, Y, K, G)=(NA, NA, NA, NA, 1). That is, the real object 102B is an object including only a spot color component without any basic color components.

The reference object 103B references a real object 104B, which is a cache object.

The spot color flattener 36 separates input real objects into basic color objects and spot color objects. The spot color flattener 36 outputs the basic color objects to the basic-color intermediate data buffer 42-1 of the back-end device 40 and the spot color objects to a page spot color spool 366. In the example in FIG. 3, the real object 102A, which is the first object input into the spot color flattener 36, does not contain any spot color component. As a result of separating the real object 102A, a basic color object having a color (C, M, Y, K)=(1, 0, 0, 0) is generated, but a spot color object is not generated. This basic color object is output to the basic-color intermediate data buffer 42-1 of the back-end device 40, and is the first basic color object within a dotted-line portion "output page intermediate data" on the top right side of FIG. 3.

The reference object 103A is input into the spot color flattener 36 next and is directly output to the basic-color intermediate data buffer 42-1 subsequent to the above-described basic color object.

The real object 102B input into the spot color flattener 36 next has a spot color component without any basic color components. A spot color object is thus generated and is input into the page spot color spool 366. If an object having a spot color component is included in the page 100 subsequent to the real object 102B (though such an object is not shown in FIG. 3), the following processing is executed on the real object 102B stored in the page spot color spool 366. When the subsequent spot color object is input into the page spot color spool 366, a portion of the real object 102B hidden by the subsequent spot color object is removed. This processing is called eclipse processing.

The reference object 103B is input into the spot color flattener 36 next and is directly output to the basic-color intermediate data buffer 42-1 subsequent to the reference object 103A.

After finishing processing the final object (reference object 103B) within the page 100, the objects stored in the page spot color spool 366 are output to the spot-color intermediate data buffer 42-2 of the back-end device 40. In the example in FIG. 3, spot-color transmission information (set) for setting the transmission ratio of each object in the page spot color spool 366 is first output, and then, color data of each object is converted into that of basic color components by a spot color converter 368, and the converted spot color object is output to the spot-color intermediate data buffer 42-2. Thereafter, spot-color transmission information (reset) for resetting the transmission ratio set by the above-described spot-color transmission information (set) is output.

The three objects stored in the basic-color intermediate data buffer 42-1 (real object 102A and reference objects 103A and 103B) and an object group stored in the spot-color intermediate data buffer 42-2 (spot-color transmission information (set), real object 102B, and spot-color transmission information (reset)) are connected with each other in the data connector 43 of the back-end device 40. The data connector 43 connects the object group in the basic-color intermediate data buffer 42-1 and the object group in the spot-color intermediate data buffer 42-2 in this order and supplies them to the renderer 44. That is, the objects in the page 100 are input into the renderer 44 in order in the top-bottom direction indicated in the dotted-line portion "output page intermediate data" on the top right side of FIG. 3.

The real objects 104A and 104B respectively referenced by the reference objects 103A and 103B have appeared in a page prior to the page 100 including the reference objects 103A and 103B and have been converted into intermediate data (indicated by "cache intermediate data" on the bottom left section in FIG. 3) when processing this page. The colors of both of the real objects 104A and 104B are (C, M, Y, K, G)=(NA, NA, NA, NA, 1). That is, the real objects 104A and 104B are objects only containing a spot color component without any basic color components. The real objects 104A and 104B are input into a cache spot color spool 367 in this order. When a cache object (spot color object) is converted into intermediate data, it is still unknown how the cache object will overlap another spot color object disposed within a page including a referencing object. Regarding a spot color object, which is not a cache object, it is already known how this spot color object overlaps another spot color object in the same page. In contrast, a cache object is not subjected to eclipse processing in the cache spot color spool 367. When outputting the real object 104A from the cache spot color spool 367 to the cache 45 of the back-end device 40, the front-end device 30 first outputs spot-color transmission information (set) to be applied to this cache object, and then converts color data of this cache object into that of basic color components by using the spot color converter 368 and outputs the converted cache object. The front-end device 30 then outputs spot-color transmission information (reset) for canceling the spot-color transmission information (set). For the real object 104B in the cache spot color spool 367, the front-end device 30 performs similar output processing.

FIGS. 4A through 4D illustrate the transition of rendering data subjected to rendering processing in the renderer 44 at different stages when the objects in the dotted-line portion "output page intermediate data" on the top right side of FIG. 3 are sequentially input into the renderer 44.

FIG. 4A schematically illustrates the state of a page memory 140 when the renderer 44 has drawn an image of the first object of the page 100, that is, the real object 102A having a basic color component. The page memory 140 is a memory storing an image of the page 100.

FIG. 4B illustrates the state of the page memory 140 when the renderer 44 has drawn an image of the reference object 103A. When drawing an image of the reference object 103A, the renderer 44 reads the real object 104A (will be called cache A), which is referenced by the reference object 103A, from the cache 45 and then writes an image of the cache A into the page memory 140. The cache A is a spot color object in which spot-color transmission information (set) is set, although the color data of the cache A has been converted into that of basic color components. The renderer 44 combines the pixel values of the cache A with those in the page memory 140 by using the transmission ratio indicated by the spot-color transmission information (set).

FIG. 4C illustrates the state of the page memory 140 when the renderer 44 has drawn an image of the reference object 103B. The reference object 103B references the real object 104B (will be called cache B) in the cache 45. The cache B is a spot color object in which spot-color transmission information (set) is set although the color data of the cache B has been converted into that of basic color components. The renderer 44 combines the pixel values of the cache B with those in the page memory 140 by using the transmission ratio indicated by the spot-color transmission information (set). As a result, the color of the region where the cache A and the cache B overlap each other in the page memory 140 becomes dark because the spot color of the cache A and that of the cache B are superimposed on each other.

FIG. 4D illustrates the state of the page memory 140 when the renderer 44 has drawn an image of the real object 102B. The color data of the real object 102B has been converted into that of basic color components. The renderer 44 combines the pixel values of the real object 102B with those in the page memory 140 by using the transmission ratio indicated by the spot-color transmission information (set). As a result, the color of the region where the cache A and the cache B overlap each other in the page memory 140 becomes even darker after the color of the real object 102B is superimposed on the colors of the cache A and the cache B.

In the example in FIGS. 4A through 4D, the cache A, cache B, and real object 102B have the same spot color (G=1). In the method using a page memory of a spot color channel according to the related art, images of these objects are sequentially drawn in the page memory by executing knockout processing, and thus, the spot color of a region where these objects overlap each other does not become dark. The spot color is supposed to be handled in this manner. In the above-described example, however, objects having simulated basic color components converted from the spot color component are cached in the cache 45 and are reused. The color of a region where these spot color objects overlap each other becomes dark.

Regarding real objects having a spot color included within the same page, it is already known how they overlap each other and the overlapping order of the objects is fixed. Accordingly, the overlapping portions of these objects can be handled by eclipse processing when they are input into the page spot color spool 366. In contrast, concerning cached spot color objects or a cached spot color object and a real object having a spot color shown in the examples in FIGS. 3 through 4D, it is unknown how they overlap each other and the overlapping order of the objects does not become fixed until a page in which such objects actually appear is processed. Additionally, cached spot color object may be reused on different pages, and the overlapping pattern of such an object with another spot color object may be different according to the page on which it is reused. To address the above-described issue, the following measures may be taken. When storing a spot color object in the cache 45, it is subjected to eclipse processing in accordance with the overlapping pattern with another spot color object on each page on which it may be reused. However, generating such a cache object in advance is not practical in terms of the processing cost.

In a first exemplary embodiment, the spot color flattener 36 performs preparatory processing so that the back-end device 40 can reuse a spot color object in the cache 45 under normal conditions. This preparatory processing will be described below with reference to FIG. 5.

Figure 5:
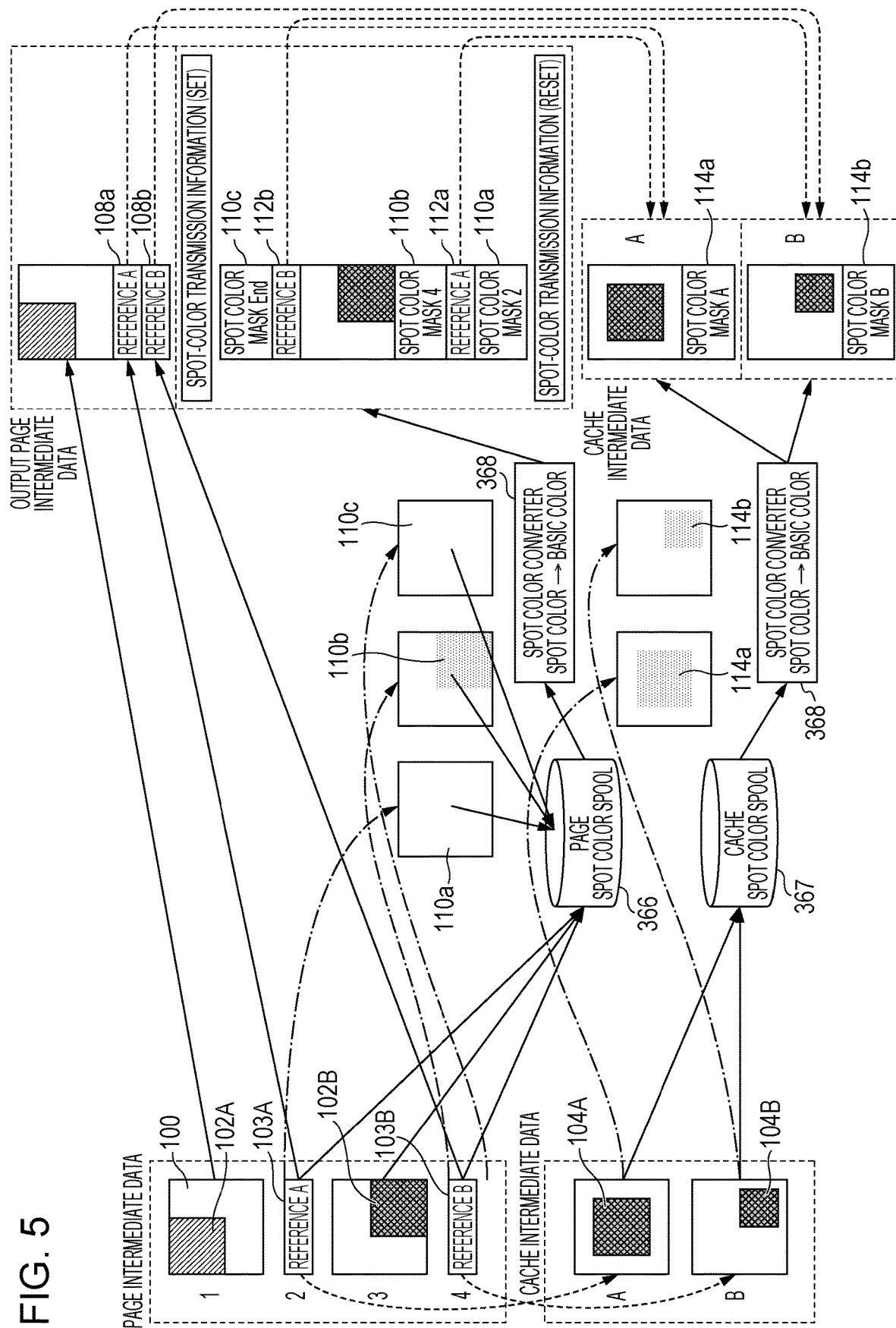
FIG. 5 illustrates an example of processing executed by a spot color flattener in a case in which a spot color object is cached according to a first exemplary embodiment.
Figure 6:
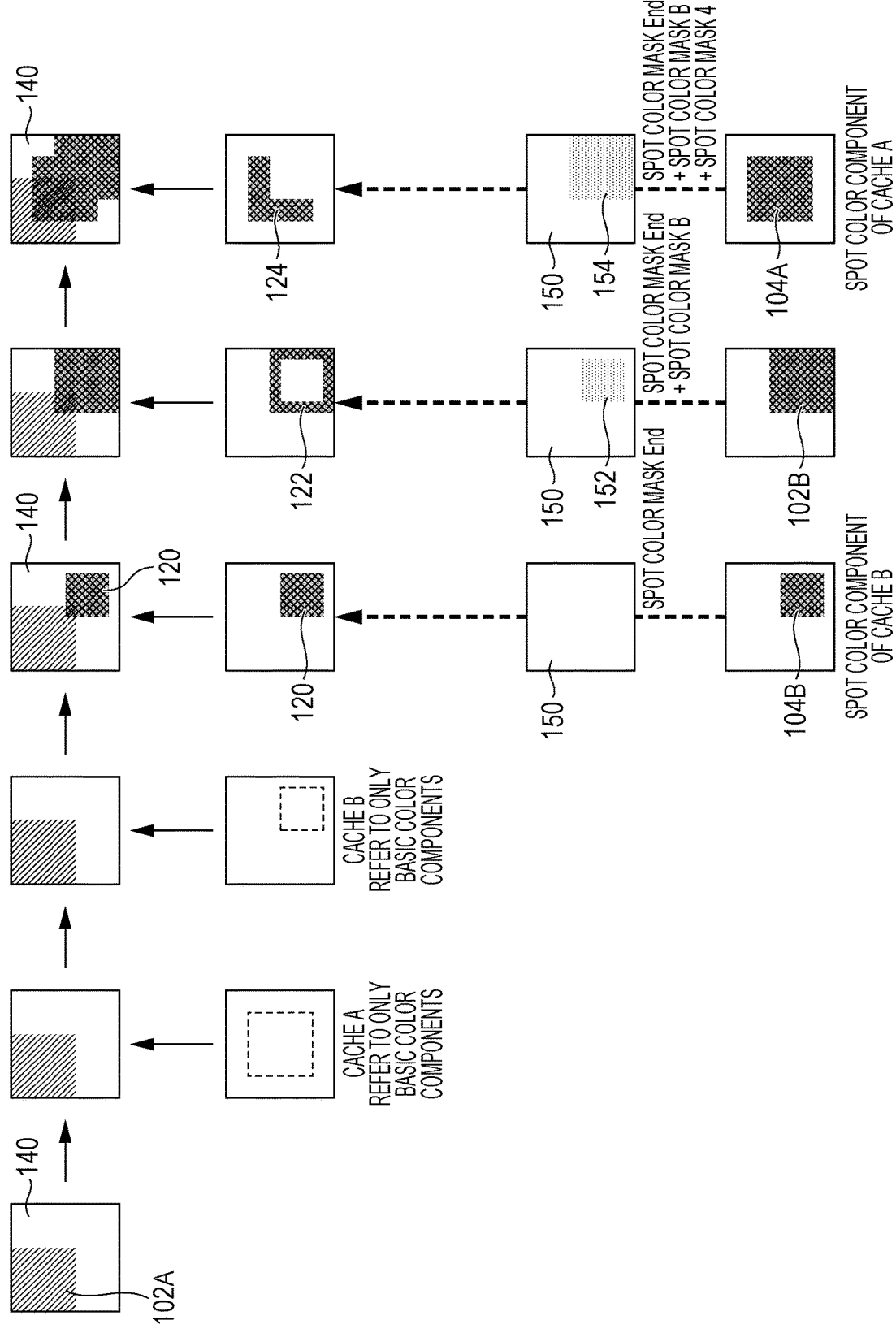
FIGS. 6A through 6F illustrate an example of processing executed by a renderer in a case in which a spot color object is cached according to the first exemplary embodiment.

In the example in FIG. 5, page intermediate data and cache intermediate data input into the spot color flattener 36 shown on the left side of FIG. 5 are the same as those on the left side of FIG. 3.

In the example in FIG. 5, the real object 102A, which is the first object in the page 100, only has a basic color component. The spot color flattener 36 thus outputs the real object 102A to the basic-color intermediate data buffer 42-1, as in the example in FIG. 3.

When the reference object 103A (will be called reference A) is input, the spot color flattener 36 performs the following operations (1) through (3).

(1) Among 0 or more objects input in a range from a "divider" immediately before the reference A to the reference A, the spot color flattener 36 executes logical OR between objects having a spot color component so as to generate a mask object 110a (also called a spot color mask 2) having an integrated two-dimensional shape of these objects. Such a shape will be called the logical OR shape. Objects arranged in the rendering order within one page are formed into groups, and each group has 0 or more objects from which one spot color mask is generated. "Dividers" are positions at which the objects are formed into such groups. Examples of the dividers are a position immediately before the first real object within a page, a position immediately after the final real object within the page, and a position of a reference object. A group of 0 or more real objects between two adjacent dividers is assumed as one group, and the logical OR shape between spot color components of real objects included in a group is set to be a spot color mask of this group. The mask object is an intermediate data object which defines the shape of a mask to be applied to the rendering of the subsequent object. The mask object represents the shape of a mask but does not have color data. In this example, the divider immediately before the reference A is the position immediately before the first object within the page 100, and only the real object 102A is disposed in a range from this first object until the position immediately before the reference A. The real object 102A has no spot color, and the mask object 110a is accordingly an empty object. The spot color flattener 36 then inputs the generated mask object 110a into the page spot color spool 366. The spot color mask 2 means that this mask is a spot color mask at a position immediately before the second object (reference A) in the rendering order within the page 100.

(2) The spot color flattener 36 then inputs a spot color component 112a of the reference A into the page spot color spool 366. The spot color component 112a is an object including identification information indicating an object (real object 104A in this example) to be referenced by the reference A and an instruction to reference only the spot color of the referenced object.

(3) The spot color flattener 36 also outputs a basic color component 108a of the reference A to the basic-color intermediate data buffer 42-1. The basic color component 108a is an object including identification information indicating an object (real object 104A in this example) to be referenced by the reference A and an instruction to reference only the basic colors of the referenced object.

When the real object 102B, which is the next object, is input, the spot color flattener 36 directly inputs the real object 102B into the page spot color spool 366, as in the example in FIG. 3, because the real object 102B only has a spot color. Basic color components are not output because the real object 102B does not have any basic color.

When the reference object 103B (will be called reference B) is input, the spot color flattener 36 executes the following operations (4) through (6).

(4) The spot color flattener 36 first generates a mask object 110b having a logical OR shape between spot color components of a group of real objects in a range from the divider immediately before the reference B (reference A in this case) to the reference B. The reference B is the fourth object within the page 100, and the mask object 110b, which is a spot color mask at a position immediately before the reference B, is called a spot color mask 4. Only the real object 102B is disposed in a range from the reference A to the reference B. The real object 102B contains a spot color component, and the mask object 110b (spot color mask 4) has the shape of the real object 102B as a mask. The spot color flattener 36 then inputs the generated mask object 110b into the page spot color spool 366.

(5) The spot color flattener 36 then inputs a spot color component 112b of the reference B to the page spot color spool 366.

(6) The spot color flattener 36 also outputs a basic color component 108b of the reference B to the basic-color intermediate data buffer 42-1.

Thereafter, if there is an object subsequent to the reference B in the rendering order within the page 100, the spot color flattener 36 performs processing for such an object similar to that for the above-described real object or reference object.

In this example, the reference B is the final object within the page 100, and the reference B is accordingly the final divider in the page 100. No real object is present between the reference B and this final divider (reference B). The spot color flattener 36 thus outputs an empty object to the page spot color spool 366 as a mask object 110c (spot color mask End), which is the final mask in the page 100.

At the stage in which all the objects within the page 100 have been processed, the spot color mask 2, the spot color component 112a of the reference A, the spot color object 102B, the spot color mask 4, the spot color component 112b of the reference B, and the spot color mask End are stored in the page spot color spool 366 in this order. This order is an order in which these objects are input into the page spot color spool 366. If these objects are arranged according to the above-described group divided by a divider as a unit, they are formed into the following five groups. Numbers 1 through 5 of the groups represent the order in which the objects in these groups are input into the page spot color spool 366.

(Group 1: From the Head of the Page to Reference A)

In group 1 in the page spot color spool 366, an empty spot color object and the spot color mask 2 are arranged in this order. That is, the objects included in group 1 have no spot color components, and the spot color object within group 1 is empty. The spot color mask 2 is also an empty object practically.

(Group 2: Reference A)

Group 2 in the page spot color spool 366 is constituted by the spot color component 112a of the reference A. The subject of group 2 is a pair of a spot color mask A and the real object 104A within the cache spot color spool 367 pointed by the spot color component 112a of the reference A.

(Group 3: From Reference a to Reference B)

In group 3 in the page spot color spool 366, the spot color object 102B and the spot color mask 4 are arranged in this order.

(Group 4: Reference B)

Group 4 in the page spot color spool 366 is constituted by the spot color component 112*b* of the reference B. The subject of group 4 is a pair of a spot color mask B and the real object 104B within the cache spot color spool 367 pointed by the spot color component 112*b* of the reference B.

(Group 5: From Reference B to the End of the Page)

In group 5 in the page spot color spool 366, an empty spot color object and the spot color mask End are arranged in this order. That is, group 5 does not have any object, and the spot color object within group 5 is empty. The spot color mask End is also an empty object practically.

After finishing processing the final object (reference object 103B) within the page 100, the front-end device 30 outputs the objects within the page spot color spool 366 to the spot-color intermediate data buffer 42-2 of the back-end device 40 according to the group unit. In this case, the front-end device 30 outputs the group units of objects in reverse order of the order in which they are input into the page spot color spool 366. The front-end device 30 also outputs spot-color transmission information (set) at a position prior to the objects and spot-color transmission information (reset) at a position subsequent to the objects.

In the example in FIG. 5, the spot-color transmission information (set) is first output to the spot-color intermediate data buffer 42-2, followed by the objects in groups 5, 4, 3, 2, and 1 to the spot-color intermediate data buffer 42-2 in this order. The order of objects within the same group is not reversed, but remains the same as the order in which they are input into the page spot color spool 366. For example, the spot color object 102B and the spot color mask 4 in group 3 are output in this order. After outputting the objects of groups 5, 4, 3, 2, and 1, the spot-color transmission information (reset) is output to the spot-color intermediate data buffer 42-2.

As a result of the above-described output control processing, as shown in FIG. 5, spot-color transmission information (set), spot-color mask End, spot color component 112*b* of reference B, real object 102B (spot color component), spot color mask 4, spot color component 112*a* of reference A, spot color mask 2, and spot-color transmission information (reset) are output from the spot color flattener 36 to the spot-color intermediate data buffer 42-2 in this order.

As described above, in the first exemplary embodiment, when spot color objects of all objects contained in one page, which is the unit of output, are stored in the page spot color spool 366, they are output in reverse order of the order in which they are stored in the page spot color spool 366. The objects in the unit of output (page) are divided into multiple sections (groups) in the rendering order, such as a section from the first object to the first reference object, a section from the first reference object to the next reference object, . . . , and a section from the final reference object to the final object within the unit of output. The spot color objects included in each section are formed into one group, and one spot color mask is formed for each group. The objects forming this group (subjected to eclipse processing) and the subsequent spot color mask are formed into one pair. The multiple pairs are then output from the page spot color spool 366 to the back-end device 40 in reverse order of the order in which they are arranged within the unit of output.

In this manner, the three objects (real object 102A, basic color component 108*a* of reference A, and basic color component 108*b* of reference B) stored in the basic-color intermediate data buffer 42-1 and the objects stored in the spot-color intermediate data buffer 42-2 are connected with each other in the data connector 43 of the back-end device 40. The objects in the basic-color intermediate data buffer 42-1 and the objects in the spot-color intermediate data buffer 42-2 are connected with each other in this order, and the connected objects are input into the renderer 44. That is, the objects are output to the renderer 44 in order in the top-bottom direction in the dotted-line portion "output page intermediate data" on the top right side of FIG. 5.

The real objects 104A and 104B respectively referenced by the reference objects 103A and 103B have appeared in a page prior to the page 100 and have been converted into intermediate data (indicated by "cache intermediate data" on the bottom left section in FIG. 5) when processing this page. The colors of both of the real objects 104A and 104B are (C, M, Y, K, G)=(NA, NA, NA, NA, 1). That is, the real objects 104A and 104B are objects only containing a spot color component without any basic color components.

When the real object 104A is input, the spot color flattener 36 first inputs a spot color mask 114*a* (spot color mask A) representing the shape of a spot color component of the real object 104A (will be called cache A) into the cache spot color spool 367, and then inputs the cache A into the cache spot color spool 367. In this example, the real object 104A contains a spot color component, and the spot color mask A has the same shape as the real object 104A. In contrast, if the real object 104A does not contain any spot color component, the spot color mask A is an empty mask. In this manner, for one object to be cached, when a spot color mask of this object and the object are input into the cache spot color spool 367, the spot color flattener 36 outputs the objects within the cache spot color spool 367 to the cache 45 in reverse order of the order in which they are stored in the cache spot color spool 367. That is, in this example, a real object to be cached and a spot color mask representing the shape of this real object if the real object contains a spot color component form one group, and the objects forming this group are output to the cache 45 in reverse order of the order in which they are input into the cache spot color spool 367. In the example in FIG. 5, the real object 104A and the spot color mask 114*a* are output to the cache 45 in this order. Before outputting the real object 104A to the cache 45, the spot color component of the real object 104A is converted into basic color components by the spot color converter 368. The real object 104A and the spot color mask 114*a* are stored in the cache 45 as one group. Hence, when the real object 104A is read out to be referenced by the reference object 103A, the spot color mask 114*a* is also read out.

When the real object 104B (cache B) is input, the spot color flattener 36 executes processing similar to that for the real object 104A. Then, the real object 104B (converted into color data of basic color components) and a spot color mask 114*b* (spot color mask B) are stored in the cache 45 in this order as one group.

A description will be given, with reference to FIGS. 6A through 6F, of different stages of rendering processing executed in the renderer 44 when the objects in the dotted-line portion "output page intermediate data" on the top right side of FIG. 5 are sequentially input into the renderer 44.

At the stage in FIG. 6A, the renderer 44 draws an image of the basic color object (real object 102A), which is the first object input into the renderer 44, in the page memory 140.

At the stage in FIG. 6B, the renderer 44 draws an image of the basic color component 108*a* of the reference A, which is input next, in the page memory 140. In this example, the basic color component 108*a* of the reference A refers to the basic color component of the cache A (real object 104A) in the cache 45. The cache A only has a spot color component without any basic color components. Accordingly, the image within the page memory 140 remains the same.

At the stage in FIG. 6C, the renderer 44 draws an image of the basic color component 108*b* of the reference B in the page memory 140. The basic color component 108*b* of the reference B refers to the basic color component of the cache B (real object 104B) in the cache 45. The cache B only has a spot color component without any basic color components. Accordingly, the image within the page memory 140 remains the same.

At the stage in FIG. 6D, upon input of spot-color transmission information (set), the renderer 44 sets the transmission ratio indicated by the spot-color transmission information. Thereafter, the spot-color transmission information (set) is applied to the rendering of the objects until spot-color transmission information (reset) is input.

The spot color mask End (mask object 110*c*) is then input into the renderer 44. The renderer 44 draws an image of the spot color mask End in a mask memory 150. The mask memory 150 is a memory storing a mask bitmap (binary bitmap which represents pixels to be masked as 1 and pixels not to be masked as 0). The spot color mask End is an empty mask. The mask in the mask memory 150 remains empty.

The spot color component 112*b* of the reference B is then input into the renderer 44. The object of the spot color component 112*b* refers to the spot color component of the cache B (real object 104B) stored in the cache 45. The renderer 44 applies the mask currently stored in the mask memory 150 to the spot color component of the cache B. At this stage, the mask memory 150 is empty, and the spot color component of the cache B after the mask is applied is maintained as an object 120. The renderer 44 then draws an image of the object 120 in the page memory 140.

At the stage in FIG. 6E, the renderer 44 reads the spot color mask B (spot color mask 114*b*) corresponding to the spot color component of the cache B from the cache 45, and draws an image of the spot color mask B in the mask memory 150. As a result, a mask 152 having the same shape as the spot color mask B is formed in the mask memory 150.

The real object 102B (converted into color data of basic color components), which is a spot color object, is input into the renderer 44. The renderer 44 applies the mask 152 to the real object 102B so as to generate an object 122. The shape of the object 122 is equal to that in which the shape of the spot color component of the cache B (that is, the shape of the object 120) is removed from the real object 102B. The renderer 44 draws an image of the object 122 in the page memory 140. The object 122 does not overlap the object 120 which has been drawn at the previous stage. Accordingly, a superimposing portion of the spot color, which makes the spot color dark, is not observed in the image of the object 122.

At the stage in FIG. 6F, the spot color mask 4 (mask object 110*b*) is input into the renderer 44. The renderer 44 draws an image of the spot color mask 4 in the mask memory 150. As a result, in the mask memory 150, a mask 154 is formed. The mask 154 has a logical OR shape between the existing mask 152 (=spot color mask End (empty)+spot color mask B, where "+" indicates logical OR operation) and the spot color mask 4.

The spot color component 112*a* of the reference A is then input into the renderer 44. The object of the spot color component 112*a* refers to the spot color component of the cache A (real object 104A) in the cache 45. The renderer 44 applies the mask 154 currently stored in the mask memory 150 to the spot color component of the cache A. The shape of a resulting object 124 is equal to that in which the logical OR shape between the spot color component of the cache B and the real object 102B (that is, the logical OR shape between the objects 120 and 122) is removed from the real object 104A. The renderer 44 then draws an image of the object 124 in the page memory 140. The object 124 overlaps neither of the objects 120 and 122 which have been drawn at the previous stages. Accordingly, a superimposing portion of the spot color, which makes the spot color dark, is not observed in the image of the object 124.

The renderer 44 then reads the spot color mask A (spot color mask 114*a*) corresponding to the spot color component of the cache A from the cache 45, and draws an image of the spot color mask A in the mask memory 150. As a result, a mask having the logical OR shape among the spot color component of the cache B, the real object 102B, and the spot color component of the cache A is formed in the mask memory 150. Then, the spot color mask 2 (mask object 110*a*) is input into the renderer 44. The renderer 44 draws an image of the spot color mask 2 (empty mask) in the mask memory 150, and the mask in the mask memory 150 remains the same. Thereafter, the spot-color transmission information (reset) is input into the renderer 44 and cancels the spot-color transmission information (set). Rendering processing of this page is then completed.

Figure 7:
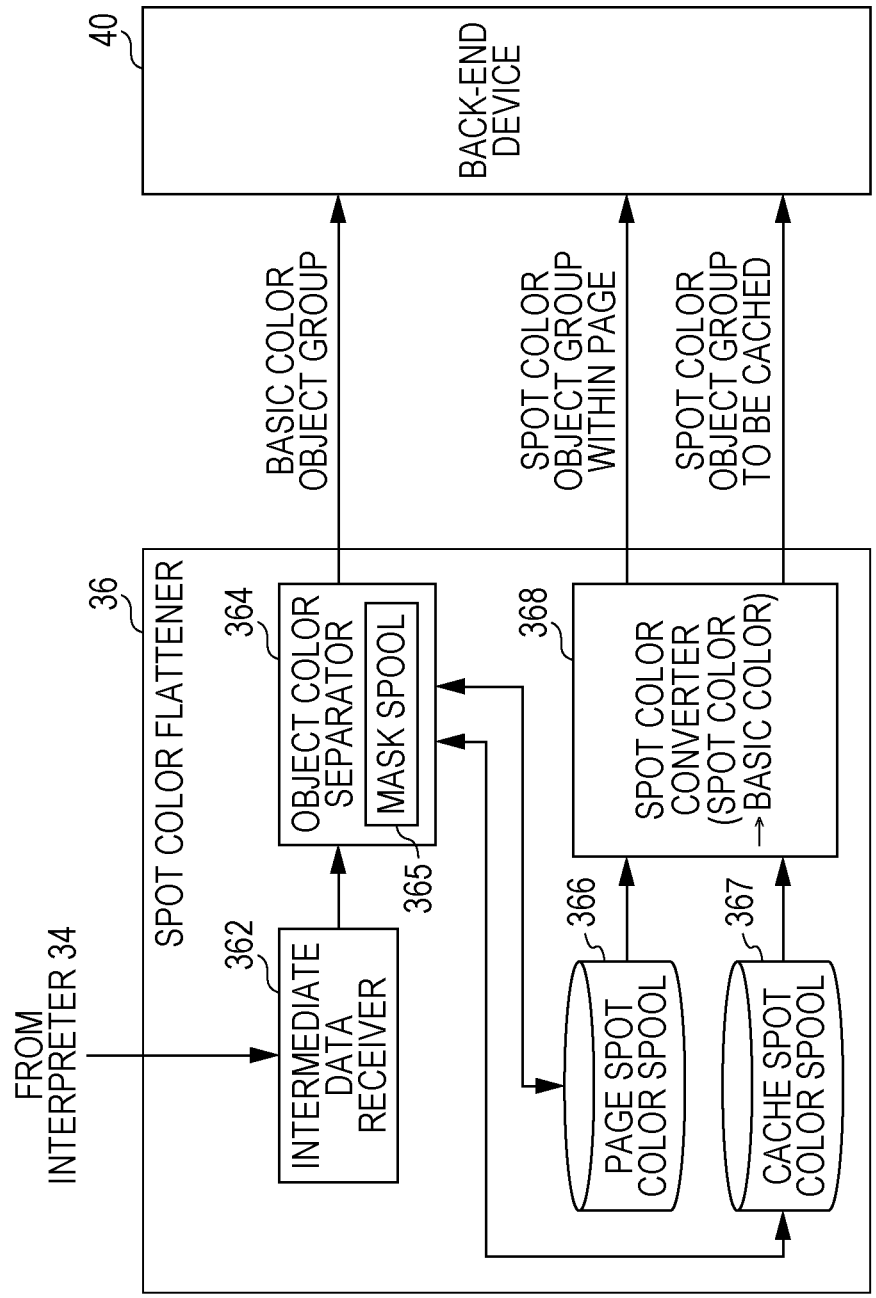
FIG. 7 illustrates an example of the internal configuration of the spot color flattener.

An example of the functional configuration of the spot color flattener 36 which implements the processing shown in FIG. 5 will be described below with reference to FIG. 7. In the example in FIG. 7, the spot color flattener 36 includes an intermediate data receiver 362, an object color separator 364, the page spot color spool 366, the cache spot color spool 367, and the spot color converter 368.

The intermediate data receiver 362 receives intermediate data of each object input from the interpreter 34, and supplies it to the object color separator 364.

The object color separator 364 separates a received intermediate data object into a basic color object constituted by only basic color components and a spot color object constituted by only a spot color component. The basic color object and the spot color object separated from the intermediate data object are different only in color data. Other items of data (such as bounding box and object shape) of the basic color object and those of the spot color object are the same as those of the intermediate data object. The color data of the basic color object indicates the values of only basic color components (for example, CMYK), while that of the spot color object indicates only the name of a corresponding spot color.

The object color separator 364 determines whether the input object is an object to be cached in the cache 45 or a regular object. A reference object which references a cache object in the cache 45 is not an object to be cached and is a regular object.

If the input object is a regular object, the object color separator 364 outputs a basic color object separated from the regular object to the basic-color intermediate data buffer 42-1 of the back-end device 40, and stores a spot color object separated from the regular object in the page spot color spool 366. When storing the spot color object in the page spot color spool 366, the object color separator 364 executes eclipse processing (hiding) on an object already stored in the page spot color spool 366. Eclipse processing is processing for hiding a spot color object already stored in a spool (page spot color spool 366 in this example) by a spot color object to be stored. That is, in eclipse processing, a preceding spot color object in the rendering order is eclipsed by a subsequent spot color object. More specifically, the object color separator 364 performs the following types of eclipse processing on objects stored in the page spot color spool 366: (1) if an object is completely covered by a spot color object to be stored (that is, this object is entirely contained within the spot color object to be stored), it is deleted from the spool; (2) if an object partially overlaps a spot color object to be stored, the overlapping portion is removed from the shape of the object; and (3) if an object does not overlap a spot color object to be stored at all, no change is made to this object. An example of eclipse processing is disclosed in Japanese Unexamined Patent Application Publication No. 2015-188212.

The object color separator 364 includes a mask spool 365. If the spot color object separated from the input object is not empty, a mask object representing the shape of this spot color object is input into the mask spool 365. The mask object is merged with a mask object already stored in the mask spool 365. As a result, a mask object (having the format of intermediate data) having the logical OR shape between the new mask object and the previous mask object is stored in the mask spool 365. Upon detecting the above-described "divider", the object color separator 364 outputs the mask object in the mask spool 365 to the page spot color spool 366 to empty the mask spool 365.

If the input object is an object to be cached, the object color separator 364 outputs the basic color object separated from this object to the cache 45 of the back-end device 40, and stores the spot color object also separated from this object in the cache spot color spool 367. When storing the spot color object in the cache spot color spool 367, the object color separator 364 executes eclipse processing on the object already stored in the cache spot color spool 367. The object color separator 364 also outputs a mask object representing the shape of this spot color object to the cache spot color spool 367.

After finishing processing the final object within a certain unit of output (logical page, for example), the spot color flattener 36 outputs spot color objects (subjected to eclipse processing) within the page spot color spool 366 to the spot-color intermediate data buffer 42-2 in reverse order of the order in which the objects are input into the page spot color spool 366. Before the spot color objects are output, the spot color converter 368 converts the color representation of the spot color objects into that of basic colors. The spot color converter 368 has information concerning the association among the name of a spot color, a combination of basic color components to be used for this spot color, and the transmission ratio. By referring to this information, the spot color converter 368 replaces the name of a spot color indicated in color data of each object by the associated basic color components and the transmission ratio. Spot-color transmission information (set) indicating this transmission ratio is added to the head of spot color objects (basic color representation), and spot-color transmission information (reset) for resetting the transmission ratio is added to the end of the spot color objects.

Regarding objects to be cached, the spot color flattener 36 outputs objects in the cache spot color spool 367 to the cache 45 object by object after they are converted into basic color components in the spot color converter 368.

Figure 8:
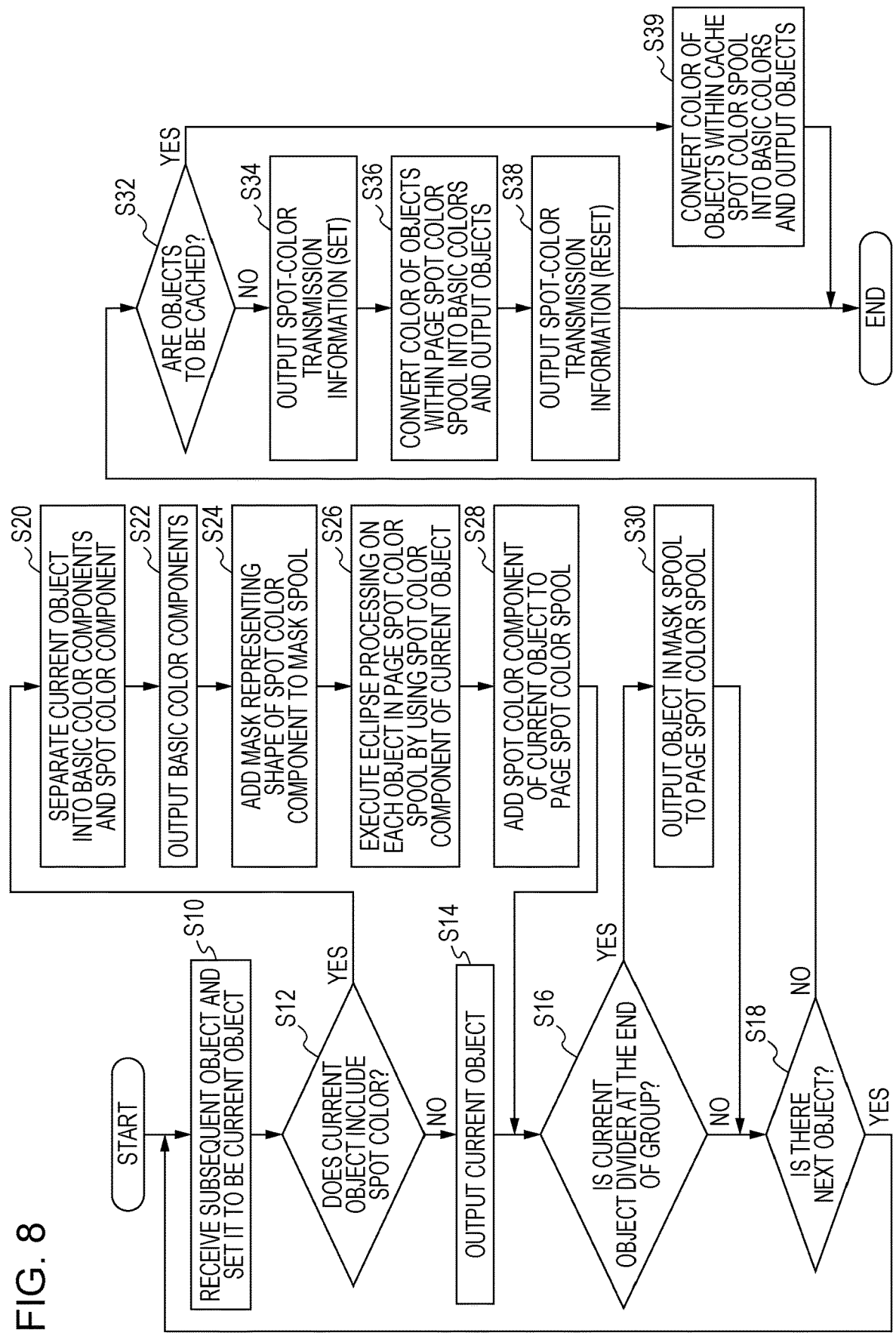
FIG. 8 is a flowchart illustrating an example of processing executed by the spot color flattener according to the first exemplary embodiment.

An example of a processing procedure executed by the spot color flattener 36 will be described below with reference to the flowchart of FIG. 8.

In this procedure, in step S10, the intermediate data receiver 362 of the spot color flattener 36 receives a new object output from the interpreter 34, and then supplies the object to the object color separator 364. This object will be called a current object. Then, in step S12, the object color separator 364 judges whether the current object is an object to be subjected to rendering in a spot color channel. This judgment is made according to whether the current object includes a spot color component in color data and whether overprint processing is specified in the current object. If overprint processing is not specified in the current object, it means that the current object will be superimposed on an underlying object by using knockout processing. In this case, the object color separator 364 determines in step S12 that the current object is an object to be subjected to rendering in a spot color channel (the result of step S12 is YES), regardless of whether the current object includes a spot color component. If overprint processing is specified and if the current object includes at least one spot color component having a positive value, the object color separator 364 determines in step S12 that the current object is an object to be subjected to rendering in a spot color channel. If overprint processing is specified and if the current object does not include any spot color component, the object color separator 364 determines in step S12 that the current object is not an object to be subjected to rendering in a spot color channel (the result of step S12 is NO).

If the result of step S12 is NO, the process proceeds to step S14. In step S14, the spot color flattener 36 outputs the current object to the basic-color intermediate data buffer 42-1. The process then proceeds to step S16.

If the result of step S12 is YES, the process proceeds to step S20. In step S20, the spot color flattener 36 separates the current object into basic color components (basic color object) and a spot color component (spot color object). Then, in step S22, the spot color flattener 36 outputs the basic color components to the basic-color intermediate data buffer 42-1. Then, in step S24, the spot color flattener 36 adds a mask object representing the shape of the spot color component to the mask spool 365. As a result, a mask object representing the logical OR shape between the above-described new mask object and the previous mask object is stored in the mask spool 365. In step S26, the spot color flattener 36 executes eclipse processing on each object in the page spot color spool 366 by using the spot color component of the current object. In step S28, the spot color flattener 36 inputs the spot color component of the current object into the page spot color spool 366. The process then proceeds to step S16.

In step S16, the spot color flattener 36 judges whether the object received in step S10 is a divider at the end of a current group. The current group is a group of objects from which one spot color mask is generated. In the example in FIG. 5, the divider at the end of the group is a reference object or the end of the page (final object).

The above-described processing is executed when the current object is a regular object (object which is not cached). If the current object is an object to be cached, the spot color flattener 36 outputs a basic color object separated from the current object to the cache 45 in steps S14 and S22. The spot color flattener 36 then skips step S26 because an object to be cached is not subjected to eclipse processing. In step S28, the spot color flattener 36 inputs a spot color object separated from the current object into the cache spot color spool 367.

If the result of step S16 is YES (if the current object is a divider at the end of a current group), the spot color flattener 36 outputs the mask object in the mask spool 365 to the page spot color spool 366 in step S30.

If the result of step S16 is NO, the spot color flattener 36 judges in step S18 whether there is a subsequent object. If there is a subsequent object (the result of step S18 is YES), the process returns to step S10. If the result of step S18 is NO, the spot color flattener 36 outputs the objects in the page spot color spool 366 and those in the cache spot color spool 367 in reverse order. In this case, the spot color flattener 36 judges in step S32 whether objects to be output are those to be cached. If the result of step S32 is NO, that is, if the objects in the page spot color spool 366 are output, the spot color flattener 36 outputs spot-color transmission information (set) to the basic-color intermediate data buffer 42-1 in step S34. At this stage, the basic color components of the objects within the page are already stored in the basic-color intermediate data buffer 42-1 in a sequential order, and the spot-color transmission information (set) is added to the end of the objects. Then, in step S36, the spot color flattener 36 outputs the objects stored in the page spot color spool 366 to the spot-color intermediate data buffer 42-2 according to the group unit in reverse order of the order in which they are input into the page spot color spool 366. Before the objects are output to the spot-color intermediate data buffer 42-2, they are subjected to color conversion in the spot color converter 368. In step S38, the spot color flattener 36 outputs spot-color transmission information (reset) to the spot-color intermediate data buffer 42-2. In the page spot color spool 366, in addition to the spot color objects, a mask object for each group is also stored. The mask object has only shape information but do not include color data. Hence, the mask object is not subjected to color conversion in step S36.

If the result of step S32 is YES, that is, if objects are those to be cached, the spot color flattener 36 outputs the objects in the cache spot color spool 367 (spot color component of the object to be cached and the corresponding mask object) to the cache 45 in step S39. Before the objects are output to the cache 45, the color data of the spot color component of the object to be cached is converted into the basic color components in the spot color converter 368.

An object group (called a super object) constituted by plural objects disposed in a certain page (the first page, for example) is cached. It is possible that such a super object be cached and referenced in a succeeding page. In this case, the plural objects forming the super object form one group. In other words, the first object and the final object forming the super group serve as dividers which define this group. The processing shown in FIG. 8 will be explained by using a super object. Objects forming a super object are sequentially read. An object X is now read. In step S24, a mask object representing the shape of a spot color component of the object X is added to the mask spool 365. In step S26, the spot color component of the previous object stored in the cache spot color spool 367 is eclipsed by the shape of the object X. In step S28, the spot color component of the object X is input into the cache spot color spool 367. After the final object in the super object has been processed, the result of step S16 becomes YES, and the mask object in the mask spool 365 is output to the cache spot color spool 367 in step S30 so as to clear the mask spool 365. In step S39, the objects in the cache spot color spool 367 are output to the cache 45 according to the group unit in reverse order in which the objects are input into the cache spot color spool 367.

Figure 9:
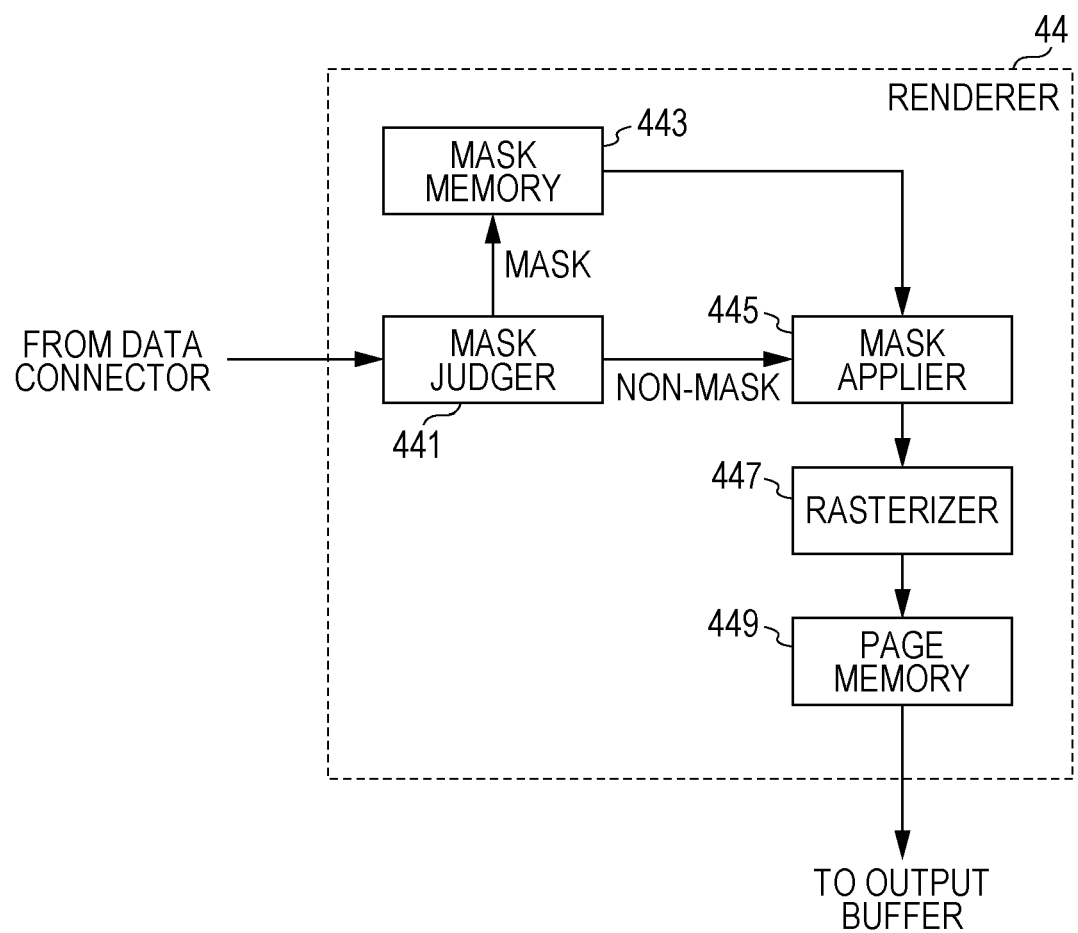
FIG. 9 illustrates an example of the internal configuration of the renderer.

An example of the functional configuration of the renderer 44 which implements the rendering processing shown in FIGS. 6A through 6F will be discussed below with reference to FIG. 9.

The renderer 44 includes a mask judger 441, a mask memory 443, a mask applier 445, a rasterizer 447, and a page memory 449.

The mask judger 441 judges whether an object input from the data connector 43 is a mask object. If the input object is a mask object, the mask judger 441 adds this mask object to the mask memory 443. In the example in FIG. 9, the mask memory 443 stores mask objects in the intermediate data format. As a result of adding the mask object, a mask object representing the logical OR shape between the previous mask object in the mask memory 443 and the added mask object is stored in the mask memory 443. If the mask memory stores mask objects in the bitmap format, the mask judger 441 adds an object found to be a mask to the mask memory 443. Then, the mask object stored in the mask memory 443 is a bitmap-format object representing the logical OR shape between the previous mask object and the added mask object.

If the input object is not a mask object, that is, if the input object is a non-mask object, the mask judger 441 supplies this object to the mask applier 445.

The mask applier 445 applies the mask object stored in the mask memory 443 to a non-mask spot color object received from the mask judger 441. That is, the mask applier 445 masks this non-mask object with the shape represented by the mask object stored in the mask memory 443. As a result, the overlapping portion of the non-mask object with the mask shape is removed from the non-mask object, and the resulting object is output from the mask applier 445. If the non-mask object and the mask shape are both in the intermediate data format, removing the mask shape from the non-mask object by the mask applier 445 is similar to eclipse processing.

If the non-mask object received from the mask judger 441 is a reference object, the mask applier 445 reads a spot color component of a cache object pointed by the reference object from the cache 45, and applies the mask object in the mask memory 443 to this spot color component.

The mask applier 445 does not apply a mask to basic color components of an object.

The rasterizer 447 rasterizes the masked object (intermediate data format) output from the mask applier 445 and writes the rasterized object into the page memory 449. As a result, bitmap data of this object is stored in the page memory 449. The bitmap data is then written into the output buffer 46. Immediately before this bitmap data is written into the output buffer 46, bitmap data of the objects prior to this object are stored in the output buffer 46. The bitmap data of the previous objects is thus written on that of the above-described object.

If the input object is spot-color transmission information (set), the rasterizer 447 retains this information, and applies the transmission ratio indicated by this information to the subsequent spot color object when rasterizing this object.

If the mask memory 443 stores mask objects in the bitmap format, the mask applier 445 rasterizes a non-mask object input from the mask judger 441 and applies a bitmap-format mask in the mask memory 443 to the rasterized object. In this case, the provision of the rasterizer 447 is omitted.

In the above-described example, in the mask memory 443, a mask object input from the data connector 43 is stored as a mask having the logical OR shape between this mask object and the previous mask object. However, this is only an example. Instead of storing the logical OR shape between mask objects, individual mask objects input from the data connector 43 may be stored in the mask memory 443 as they are. In this case, the mask applier 445 applies all of one or more masks stored in the mask memory 443 to a non-mask object. As a result, the non-mask object is masked with the logical OR shape among all of one or more masks in the mask memory 443.

Second Exemplary Embodiment: Application Example to Imposition Processing

A second exemplary embodiment will be described below. While the first exemplary embodiment has discussed an example in which spot color objects are cached and reused, the second exemplary embodiment will discuss an example in which spot color objects are used in imposition.

Imposition refers to arranging of multiple pages (logical pages) indicated by print data on one page (physical page) of paper. In imposition processing, it is possible that multiple logical pages completely or partially overlap each other on a physical page. In this case, spot color objects in different logical pages may also overlap each other on the same physical page.

Eclipse processing for objects in the page spot color spool 366 is executed for spot color objects within the same logical page.

There is a case in which imposition settings (settings for determining the arrangement pattern of logical pages on a physical page) are determined after RIP processing (conversion from PDL data into intermediate data) is executed on logical pages. In this case, when RIP processing is executed on logical pages and a group of spot color objects is spooled, it is not known which logical pages will be arranged on the same physical page. Accordingly, it is not possible to execute eclipse processing on spot color objects on each physical page at this stage. Even if eclipse processing is executed on spot color objects on the same physical page based on certain imposition settings to generate a group of spot color objects without any overlapping portion, it is not possible to reuse such a group of spot color objects if imposition settings are changed. As described above, eclipse processing may be executed by estimating the overlapping pattern of spot color objects of logical pages on the same physical page. However, this is not practical.

At the stage of executing RIP processing on a logical page, overlapping portions between spot color objects within the same logical page can be eliminated by eclipse processing. Nevertheless, this does not eliminate the overlapping portions between spot color objects of different logical pages on a physical page after imposition is performed. If the spot color of these objects has been converted into basic colors by simulations, the spot color where the spot color objects overlap each other on a physical page becomes dark, as in the case in which a cached spot color object and another spot color object disposed within a page including a referencing object overlap each other in the first exemplary embodiment.

In the second exemplary embodiment, to address the issue concerning overlapping portions between spot color objects of different logical pages arranged on the same physical page, the following approach may be adopted.

In the second exemplary embodiment, spot color objects within a logical page are subjected to eclipse processing similarly to the first exemplary embodiment, and are stored in the page spot color spool 366. Additionally, a mask having the logical OR shape at least between spot color objects in each logical page is generated. More practically, a mask having the logical OR shape among all objects (including objects without any spot color) in each logical page is generated. The generated mask for a logical page is input into the page spot color spool 366 subsequent to the spot color objects in this logical page. In the page spot color spool 366, for each of multiple logical pages forming one physical page, a pair of a spot color object group and a mask concerning this logical page is stored. After storing such pairs for one physical page, the pairs for the logical pages are output from the page spot color spool 366 in reverse order of the order in which the logical pages are arranged on the physical page. When drawing an image of the spot color object group of a certain logical page, the renderer 44 of the back-end device 40 applies a mask representing the logical OR shape of the masks which have been read into the page spot color spool 366 prior to this logical page to the spot color object group.

According to this approach, when drawing an image of a spot color object group within the first logical page, for example, the logical OR shape between spot color objects of the succeeding logical pages, which are subsequent to the first logical page in the rendering order and are superimposed on the first logical page on the physical page, is applied to the spot color object group of the first logical page as a mask. Hence, when drawing an image of the spot color objects within the first logical page, the overlapping portions with the spot color objects of the succeeding pages are removed. As a result, overlapping portions between spot color objects of the logical pages are not found in the drawn physical page.

The configuration of the front-end device 30 and that of the back-end device 40 in the second exemplary embodiment are similar to those in FIG. 2. In the second exemplary embodiment, however, processing of each logical page is not directly related to processing for caching and reusing spot color objects in the first exemplary embodiment. The provision of the cache 45 and the related processing functions may be omitted.

Processing executed by the spot color flattener 36 and the renderer 44 in the second exemplary embodiment will be discussed below through illustration of a specific example.

Figure 10:
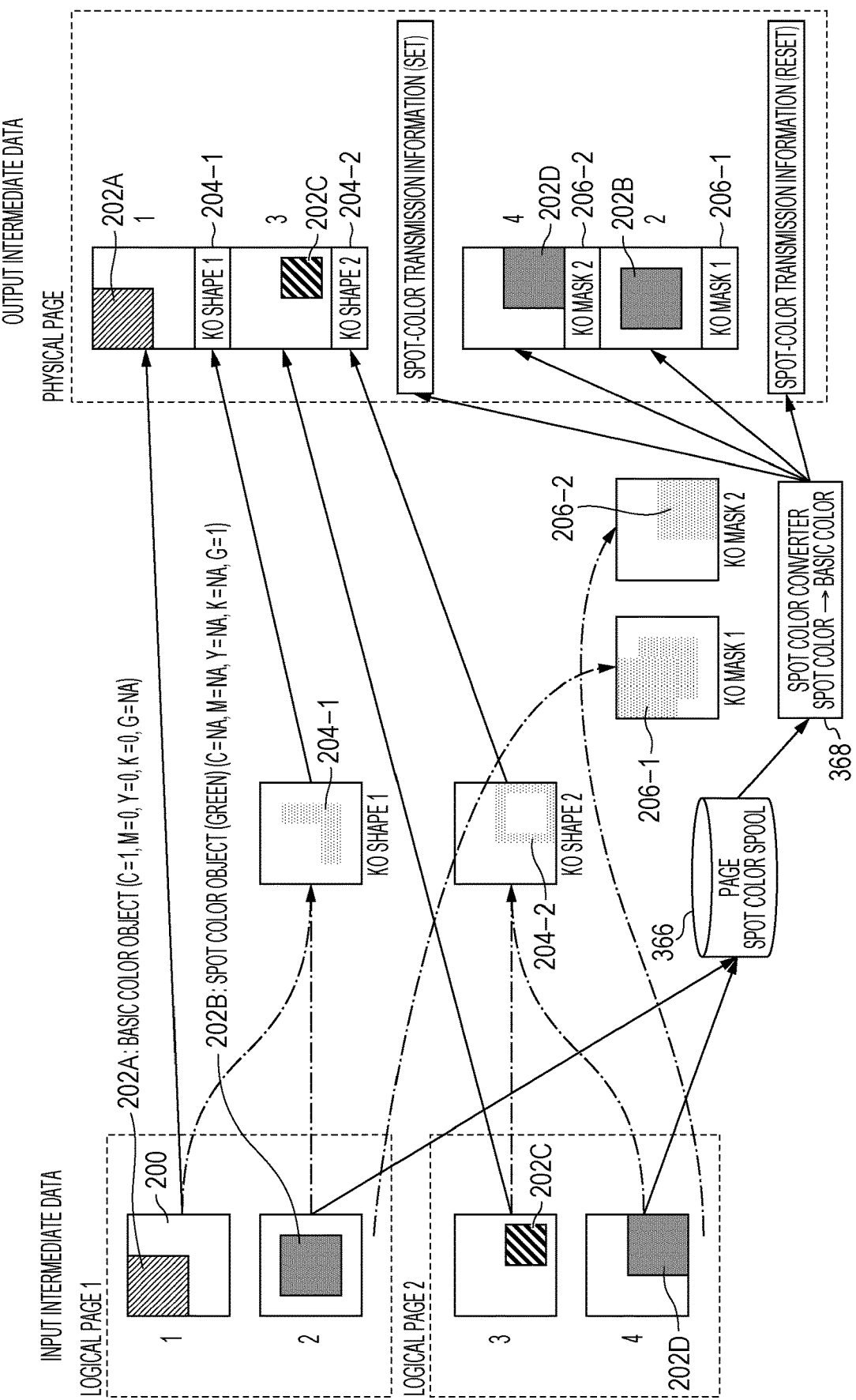
FIG. 10 illustrates an example of processing executed by the spot color flattener according to a second exemplary embodiment.
Figure 11:
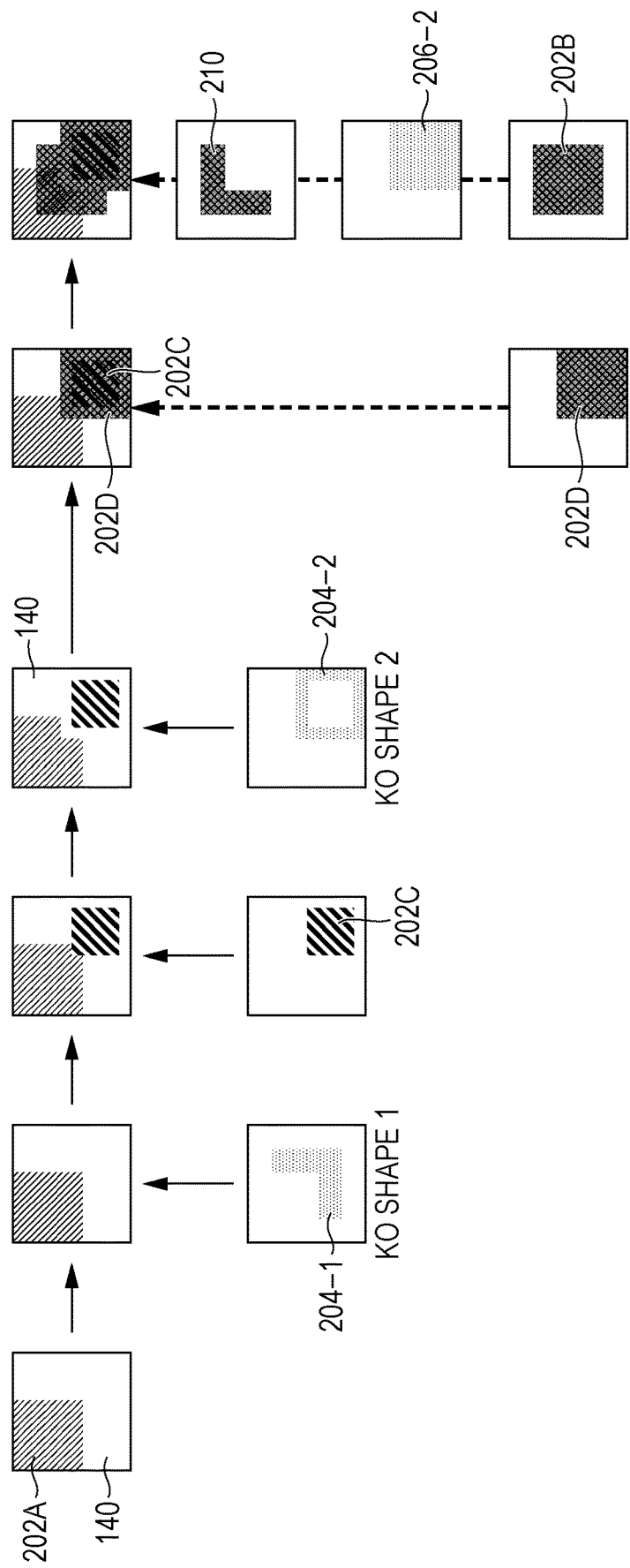
FIGS. 11A through 11F illustrate an example of processing executed by the renderer according to the second exemplary embodiment.

FIG. 10 illustrates an example of processing executed by the spot color flattener 36. In this example, two logical pages (page 1 and page 2) will be arranged on one physical page by imposition processing. The logical page 1 includes objects 202A and 202B within a page region 200. The object 202A has color data (C, M, Y, K, G)=(1, 0, 0, 0, NA) and does not contain any spot color component. The object 202B has color data (C, M, Y, K, G)=(NA, NA, NA, NA, 1) and only includes a spot color component without any basic color components. The logical page 2 includes objects 202C and 202D within the page region 200. The object 202C has color data (C, M, Y, K, G)=(0, 0, 1, 0, NA). The object 202C only has a basic color component, which is different from that of the object 202A, without any basic color components. The object 202D has color data (C, M, Y, K, G)=(NA, NA, NA, NA, 1) and only includes a spot color component without any basic color components.

In the example in FIG. 10, the first object of the logical page 1, that is, the object 202A, only has a basic color component, and the spot color flattener 36 outputs the object 202A to the basic-color intermediate data buffer 42-1.

The next object, that is, the object 202B, only has a spot color component, and the spot color flattener 36 inputs the object 202B into the page spot color spool 366. In this case, if another spot color object is already stored in the page spot color spool 366, the spot color flattener 36 executes eclipse processing on this existing spot color object by using the object 202B. In this example, the object 202B is the first object having a spot color component within the logical page 1, and another spot color object is not stored in the page spot color spool 366. The spot color flattener 36 does not execute eclipse processing.

Upon detecting that processing has reached the end of the logical page 1 (no object is left after the object 202B), the spot color flattener 36 executes the following operations (1) and (2).

(1) The spot color flattener 36 generates a knockout mask (KO mask) 206-1 (will be called a KO mask 1) having the logical OR shape between all the objects (including objects without any spot color component) in the logical page 1. The KO mask 1 is an object in the intermediate data format. The KO mask is similar to the mask objects 110a through 110c in the first exemplary embodiment, but it is different from them in that it also reflects the shapes of objects without any spot color component. This difference is due to the rule that, if logical pages to be arranged on a physical page have an overlapping portion, an object of an upper logical page knocks out an object of the lower logical page. The spot color flattener 36 inputs the generated KO mask 1 into the page spot color spool 366.

(2) The spot color flattener 36 then generates a knockout shape (KO shape) 204-1 (will be called a KO shape 1) by removing the logical OR shape between the basic color components of the objects 202A and 202B within the logical page 1 from the logical OR shape between the spot color component of the objects 202A and 202B. That is, the KO shape 1 represents the shape of a pixel group having the spot color component without any basic color components within the logical page 1. To generate the KO shape 1, for example, a first memory for storing the logical OR shape between the spot color components of objects and a second memory for storing the logical OR shape between the basic color components of the objects are prepared. Then, starting from the first object of the logical page, the spot color flattener 36 sequentially adds the shapes of the spot color components of the objects to the first memory, and adds the shapes of the basic color components of the objects to the second memory. Upon detecting that processing has reached the final object within the logical page, the spot color flattener 36 subtracts the logical OR shape represented by the object group in the second memory from that in the first memory so as to generate a KO shape. Instead of generating a single object representing the KO shape, shape information concerning a spot color component of each of the objects stored in the first memory, and shape information concerning basic color components of each of the objects stored in the second memory may be generated such that they can be distinguished from each other. The shape information concerning the individual objects can be used as information for defining a KO shape. A device at the subsequent stage (such as the back-end device 40) can reproduce a KO shape based on this information.

The spot color flattener 36 outputs the generated KO shape 1 to the basic-color intermediate data buffer 42-1. In the example in FIG. 10, only the object 202A has a basic color component within the logical page 1. At this stage, two objects, the object 202A and the KO shape 1, are stored in the basic-color intermediate data buffer 42-1 in this order. The usage and the function of a KO shape will be described later when processing of the renderer 44 is discussed with reference to FIGS. 11A through 11F.

Then, the object 202C, which is the first object within the logical page 2, is input into the spot color flattener 36. The object 202C only includes a basic color component, and the spot color flattener 36 outputs the object 202C to the basic-color intermediate data buffer 42-1.

The object 202D only has a spot color component, and the spot color flattener 36 inputs the object 202D into the page spot color spool 366.

Upon detecting that processing has reached the end of the logical page 2, the spot color flattener 36 executes processing similar to that for the logical page 1.

The spot color flattener 36 generates a knockout mask (KO mask) 206-2 (will be called a KO mask 2) having the logical OR shape among all the objects in the logical page 2, and inputs the generated KO mask 2 to the page spot color spool 366. The spot color flattener 36 then generates a KO shape 204-2 (will be called a KO shape 2) by subtracting the logical OR shape between the basic color components of the objects 202C and 202D within the logical page 2 from the logical OR shape between the spot color components of the objects 202C and 202D. The spot color flattener 36 outputs the generated KO shape 2 to the basic-color intermediate data buffer 42-1. At this stage, four objects, that is, object 202A, KO shape 1, object 202C, and KO shape 2, are stored in the basic-color intermediate data buffer 42-1 in this order.

Upon detecting that processing has reached the end of one physical page (the end of the logical page 2 in this case), the spot color flattener 36 outputs spot-color transmission information (set) to be applied to the spot color object group in the page spot color spool 366 to the spot-color intermediate data buffer 42-2. The spot color flattener 36 then outputs the object groups of the logical pages in the page spot color spool 366 to the spot-color intermediate data buffer 42-2 in reverse order of the order in which the logical pages are arranged on the physical page. Then, the spot color flattener 36 outputs spot-color transmission information (reset), which is an instruction to cancel the spot-color transmission information (set), to the spot-color intermediate data buffer 42-2. As a result, in the spot-color intermediate data buffer 42-2, the spot-color transmission information (set), a pair of the object 202D and the KO mask 2 of the logical page 2, a pair of the object 202B and the KO mask 1 of the logical page 1, and spot-color transmission information (reset) are stored in this order.

As described above, in the second exemplary embodiment, after a pair of a spot color object group and a KO mask of each of the logical pages included in one physical page, which is the unit of output, is stored in the page spot color spool 366, these pairs are output in reverse order of the order in which they are stored in the page spot color spool 366 (namely, the logical page order). That is, in the second exemplary embodiment, spot color objects included in one logical page forms a group, and one KO mask is generated for this group. The spot color objects forming this group (subjected to eclipse processing) and the associated KO mask are formed into one pair. The multiple pairs are then output from the page spot color spool 366 to the back-end device 40 in reverse order of the order in which they are stored in the page spot color spool 366 (namely, the logical page order).

For each physical page, the data connector 43 of the back-end device 40 first sequentially extracts the basic color objects to be arranged on this physical page and stored in the basic-color intermediate data buffer 42-1 and outputs the extracted objects to the renderer 44. After outputting all the objects in the basic-color intermediate data buffer 42-1, the data connector 43 then sequentially extracts the object groups in the spot-color intermediate data buffer 42-2 and outputs them to the renderer 44. As a result of the above-described output control processing, the object groups within the dotted-line portion indicated by "output intermediate data" on the right side of FIG. 10 are sequentially output to the renderer 44 in the top-bottom direction.

A description will be given, with reference to FIGS. 11A through 11F, of different stages of rendering processing executed in the renderer 44 when the objects in the dotted-line portion "output intermediate data" on the right side of FIG. 10 are sequentially input into the renderer 44. In this example, it is assumed that imposition settings are set so that the logical page 2, which is a page subsequent to the logical page 1 in the logical page order, completely covers the logical page 1 on the physical page (that is, the logical pages 1 and 2 are disposed at the same position in the plane of the physical page).

At the stage in FIG. 11A, the renderer 44 draws an image of the first object, that is, the basic color object (real object 202A), in the page memory 140. The page memory 140 stores a raster image of a physical page.

At the stage in FIG. 11B, the renderer 44 then applies the KO shape 1 to the image within the page memory 140. At this stage, the image of the object 202A is stored in the page memory 140, and the overlapping portion of the image of the object 202A with the KO shape 1 is removed. The KO shape 1 does not overlap the object 202A, and the image of the object 202A is maintained even after the application of the KO shape 1.

At the stage in FIG. 11C, the renderer 44 draws an image of the object 202C in the page memory 140.

At the stage in FIG. 11D, the renderer 44 then applies the KO shape 2 to the image within the page memory 140. The object 202C does not overlap the KO shape 2, but the object 202A overlaps the KO shape 2. Accordingly, the overlapping portion of the object 202A with the KO shape 2 is removed after applying the KO shape 2.

At the stage in FIG. 11E, upon input of spot-color transmission information (set), the renderer 44 sets the transmission ratio indicated by this information.

Thereafter, the spot-color transmission information (set) is applied to the rendering of the objects until spot-color transmission information (reset) is input.

Then, the object 202D (color data has been converted into that of basic colors) is input into the renderer 44. The renderer 44 writes an image of the object 202D into the page memory 140 by using the transmission ratio indicated by the spot-color transmission information (set).

The object 202D is a spot color object on the logical page 2. The object 202D is superimposed on the object 202C on the same logical page 2 by overprint processing, that is, the color of the object 202D transmitted at the transmission ratio is combined with that of the object 202C. However, the object 202D is supposed to be combined with the objects (object 202A in this case) on the underlying logical page 1 by knockout processing according to the imposition rules. In the example in FIGS. 11A through 11F, the portion of the object 202D which does not overlap the basic color object 202C on the same logical page 2 has been knocked out from the page memory 140 by the KO shape 2 applied at the stage in FIG. 11D. Thus, if an image of the spot color object 202D is drawn by using the transmission ratio at the stage in FIG. 11E, the resulting image formed in the page memory 140 is the same as that generated as a result of the object 202D knocking out the objects on the logical page 1.

The function of the KO shape for a certain logical page (the first page, for example) is as follows. When an image of a spot color object of the first page is drawn at a certain transmission ratio in the page memory 140 after the spot color component of this object is converted into basic colors, the KO shape for the first page serves to knock out an object of another logical page under the first page. The KO shape is formed such that the spot color component of the object in the first page is superimposed on the basic color component of the object in the first page by overprint processing.

At the stage in FIG. 11F, the KO mask 2 (KO mask 206-2) is input into the renderer 44. The renderer 44 writes the KO mask 2 into the mask memory 443 (see FIG. 9).

Then, the object 202B is input into the renderer 44. The renderer 44 masks the object 202B with the mask (KO mask 2) in the mask memory 443, and draws an image of a resulting object 210 in the page memory 140 by using the transmission ratio indicated by the spot-color transmission information (set). The object 202D having a spot color component does not have an overlapping portion with the object 202B by the application of the KO mask 2. Accordingly, after the image of the object 210 is drawn in the page memory 140 by using the transmission ratio, a superimposing portion of the spot colors of the objects 202B and 202D, which makes the spot color dark, is not found in the drawn image of the object 210.

The KO mask 1 representing the shape of the object group of the logical page 1 is not used for mask processing because the physical page does not have any logical page under the logical page 1. However, if logical page 0 is arranged under the logical page 1 within the physical page by imposition, at the stage subsequent to the stage in FIG. 11F, the KO mask 1 is added to the mask memory 443. In the mask memory 443, the KO mask 2 and the KO mask 1 are stored. When drawing an image of a spot color object within the logical page 0, the mask applier 445 masks this spot color object with the logical OR shape between the KO mask 2 and the KO mask 1 in the mask memory 443 and then draws the image of the spot color object in the page memory 140 (page memory 449).

Third Exemplary Embodiment: Another Application Example to Imposition Processing In the above-described first and second exemplary embodiments, the spot color flattener 36 of the front-end device 30 generates a KO mask representing the logical OR shape of objects within each group, and the renderer 44 of the back-end device 40 executes mask processing by using the KO mask of a corresponding group. However, this is only an example.

In another example, the spot color flattener 36 may generate a KO mask representing the shape of each object within a group, and the renderer 44 may execute mask processing by using a set of KO masks for each group. This example will be described below with reference to FIGS. 12 through 13F. Processing shown in FIGS. 12 through 13F illustrates another application example to imposition processing and may be compared with that in FIGS. 10 through 11F.

Figure 12:
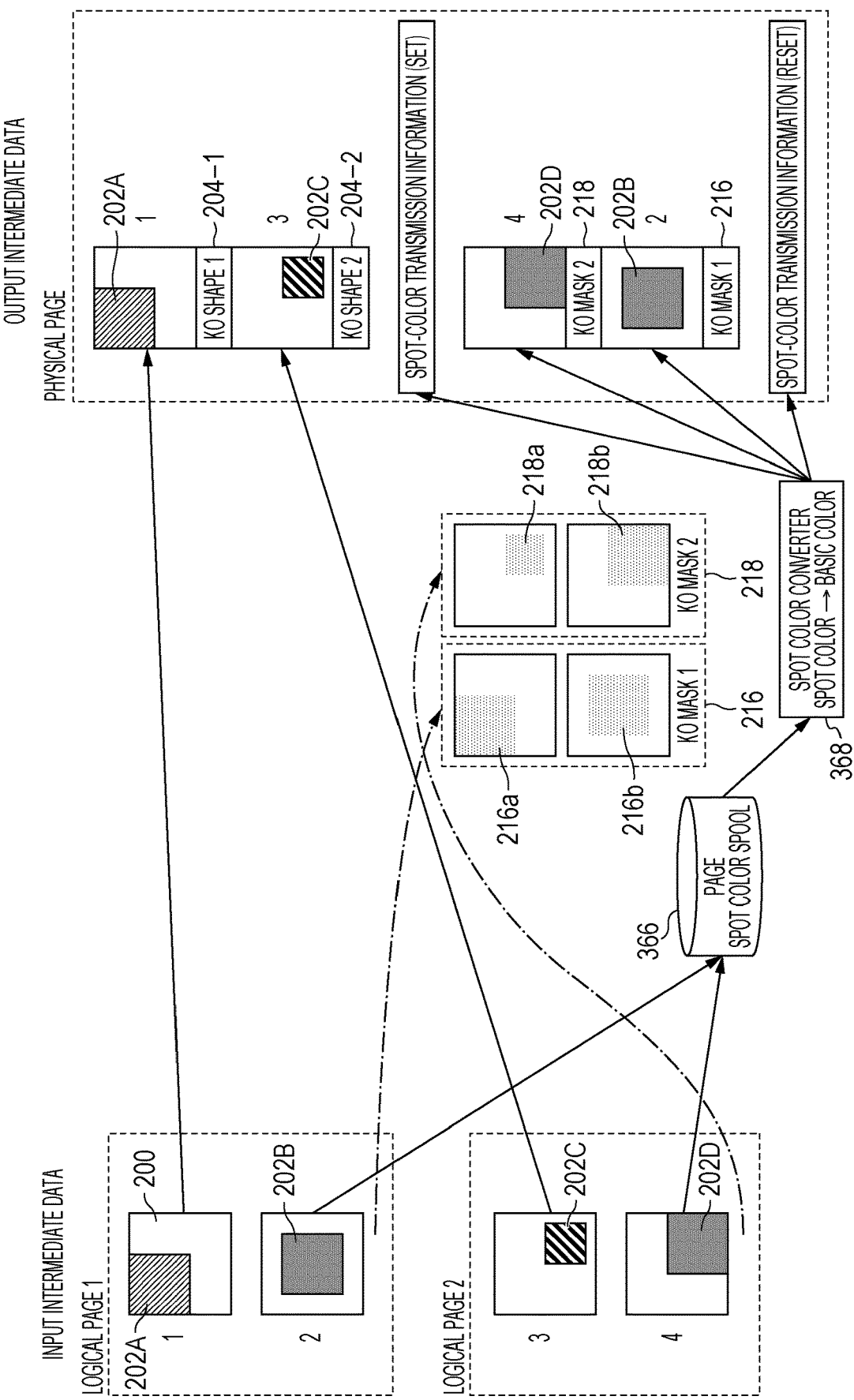
FIG. 12 illustrates an example of processing executed by the spot color flattener according to a third exemplary embodiment.
Figure 13:
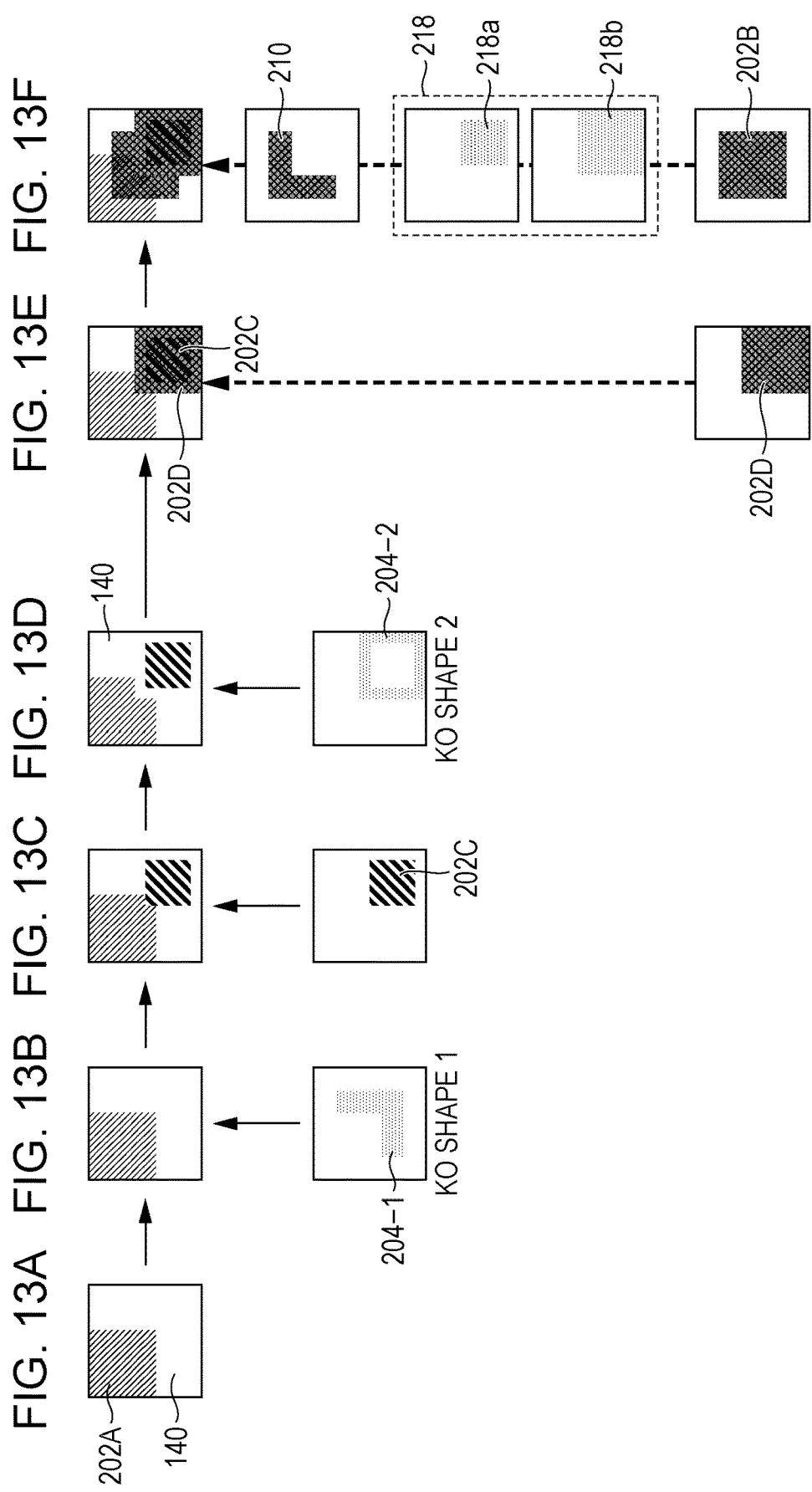
FIGS. 13A through 13F illustrate an example of processing executed by the renderer according to the third exemplary embodiment.

FIG. 12 illustrates an example of processing executed by the spot color flattener 36 according to a third exemplary embodiment. FIG. 12 illustrates processing executed by the spot color flattener 36 when the same input data (indicated by "input intermediate data in FIG. 12) as that shown in FIG. 10 is input. In the example in FIG. 12, as well as in FIG. 10, the spot color flattener 36 generates KO shapes 204-1 and 204-2, but they are not shown in FIG. 12 for the sake of simplicity. Portions of processing in FIG. 12 similar to those in FIG. 10 will not be explained.

In the example in FIG. 12, as in processing in FIG. 10, the spot color flattener 36 processes objects in the logical page 1 starting from the first object. Upon detecting that processing has reached the end of the logical page 1, the spot color flattener 36 generates knockout masks for the objects (including objects without any spot color component) within the logical page 1, that is, knockout masks (KO masks) 216a and 216b representing the shape of the corresponding objects. The KO masks 216a and 216b are objects in the intermediate data format. The spot color flattener 36 then inputs the two KO masks 216a and 216b into the page spot color spool 366 as a KO mask 1 set 216.

Then, the spot color flattener 36 starts processing the logical page 2. When processing has reached the end of the logical page 2, the spot color flattener 36 generates KO masks 218a and 218b representing the shapes of the corresponding objects. The spot color flattener 36 then inputs the two KO masks 218a and 218b into the page spot color spool 366 as a KO mask 2 set 218.

As a result of the above-described processing, when the logical pages 1 and 2 included in a certain physical page have been processed, an object group within the logical page 1 (object 202B and KO mask 1 set 216) and an object group within the logical page 2 (object 202D and KO mask 2 set 218) are stored in the page spot color spool 366 in this order.

When processing has reached the end of the physical page, the spot color flattener 36 first outputs spot-color transmission information (set), which will be applied to the spot color object group within the page spot color spool 366, to the spot-color intermediate data buffer 42-2. The spot color flattener 36 then outputs the object groups of the individual logical pages stored in the page spot color spool 366 to the spot-color intermediate data buffer 42-2 in reverse order of the order in which they are stored in the page spot color spool 366 (logical page order). The spot color flattener 36 then outputs spot-color transmission information (reset), which is an instruction to cancel the spot-color transmission information (set), to the spot-color intermediate data buffer 42-2. As a result, in the spot-color intermediate data buffer 42-2, the spot-color transmission information (set), the object 202D within the logical page 2, the KO mask 2 set 218 for the logical page 2, the object 202B within the first logical page 1, the KO mask 1 set 216 for the logical page 1, and the spot-color transmission information (reset) are stored in this order.

The major part of processing executed by the renderer 44 of the back-end device 40 according to the third exemplary embodiment will be discussed blow with reference to FIGS. 13A through 13F. FIGS. 13A through 13F illustrate different stages of rendering processing in the renderer 44 when the objects in the dotted-line portion "output intermediate data" on the right side of FIG. 12 are sequentially input into the renderer 44. In this example, as in FIGS. 10 through 11F, it is assumed that imposition settings are set so that the logical page 2, which is a page subsequent to the logical page 1 in the logical page order, completely covers the logical page 1 on the physical page (that is, the logical pages 1 and 2 are disposed at the same position in the plane of the physical page).

The stages of processing for the basic color object groups, that is, the stages shown FIGS. 13A through 13D are similar to those in FIGS. 11A through 11D. The first stage of processing for a spot color object group, that is, the stage in FIG. 13E, is also similar to that in FIG. 11E.

Processing at the stage in FIG. 13F is different from that in FIG. 11F, and will be explained below.

As shown in FIG. 13F, the KO mask 2 set 218 is input into the renderer 44. The renderer 44 stores the two KO masks 218a and 218b (both are in the intermediate data format) included in the KO mask 2 set 218 in the mask memory 443 (see FIG. 9).

The object 202B is then input into the renderer 44. The mask applier 445 of the renderer 44 sequentially applies the KO masks 218a and 218b stored in the mask memory 443 to the object 202B. For example, the renderer 44 first masks the object 202B with the KO mask 218a and then masks the masked object 202B with the KO mask 218b. If the object 202B and the KO masks 218a and 218b are in the intermediate data format, this mask processing using the KO masks 218a and 218b is equal to eclipse processing for masking the object 202B with the KO masks 218a and 218b. The KO masks 218a and 218b reflect the shapes of the corresponding objects within the same logical page 2, and either one of them may be applied first. The resulting object 210 subjected to this mask processing is the same as that shown in FIG. 11F. Thereafter, the renderer 44 draws an image of the object 210 in the page memory 140 (page memory 449) by using the transmission ratio indicated by the spot-color transmission information (set).

If another logical page, for example, the logical page 0, is present under the logical page 1 in the physical page, at the stage subsequent to the stage in FIG. 13F, the KO mask 1 set 216 is input into the renderer 44, and the KO masks 216a and 216b in the KO mask 1 set 216 are added to the mask memory 443. When drawing an image of a spot color object within the logical page 0, the mask applier 445 masks this spot color object with the KO masks 218a and 218b and the KO masks 216a and 216b in the mask memory 443. It is sufficient if the overlapping portion between this spot color object and the logical OR shape of the four KO masks is deleted, and thus, the four KO masks may be applied in any desired order.

Processing shown in FIGS. 12 through 13F is an application example to imposition processing. A similar approach can also be taken for an application example to caching of spot color objects. In the application example to caching of spot color objects discussed with reference to FIG. 5, the spot color flattener 36 generates spot color masks (mask objects 110a, 110b, and 110c, for example) each representing the logical OR shape of objects having a spot color component within a range of a section (group) between two adjacent dividers in print data. In the third exemplary embodiment, the spot color flattener 36 may generate a KO mask representing the shape of each of the objects having a spot color component within such a section (group) and store the generated KO masks in the page spot color spool 366. Then, instead of applying a KO mask representing the logical OR shape of plural objects to a corresponding object discussed with reference to FIGS. 5 through 6F, the renderer 44 applies the KO masks representing the shapes of the individual objects to a corresponding object in a certain order.

Fourth Exemplary Embodiment: Application Example to N-color Printing

In the first through third exemplary embodiments, spot color simulations for simulating a spot color by using basic colors have been discussed. However, the application of an exemplary embodiment of the disclosure is not restricted to spot color simulations. For example, as in N-color printing and transparency effects discussed in Japanese Unexamined Patent Application Publication No. 2015-188212, when the color of an object having a specific component (for example, an object of an upper color channel or an object in a group in which the degree of transparency is set) is superimposed on the color of an underlying pixel, a similar issue observed in spot color simulations also arises. To address such an issue, the above-described approach in the first through third exemplary embodiments may be adopted. This will be discussed below through illustration of two-color printing, which is a typical example of N-color printing.

A description will first be given, with reference to FIGS. 14 through 15B, of an issue which occurs when spot color simulations in two-color printing using two different spot colors are conducted by mere eclipse processing between spot color components of objects. In the following example, two spot colors used in printing are called a first color and a second color. In the example in FIGS. 14 through 15B, the first color is red and the second color is green. It is assumed that an instruction to perform knockout processing is specified in the objects. It is also assumed that two logical pages (page 1 and page 2) are disposed on one physical page by imposition processing and that imposition settings are set so that the logical page 2, which is a page subsequent to the logical page 1, completely covers the logical page 1 on the physical page.

Figure 14:
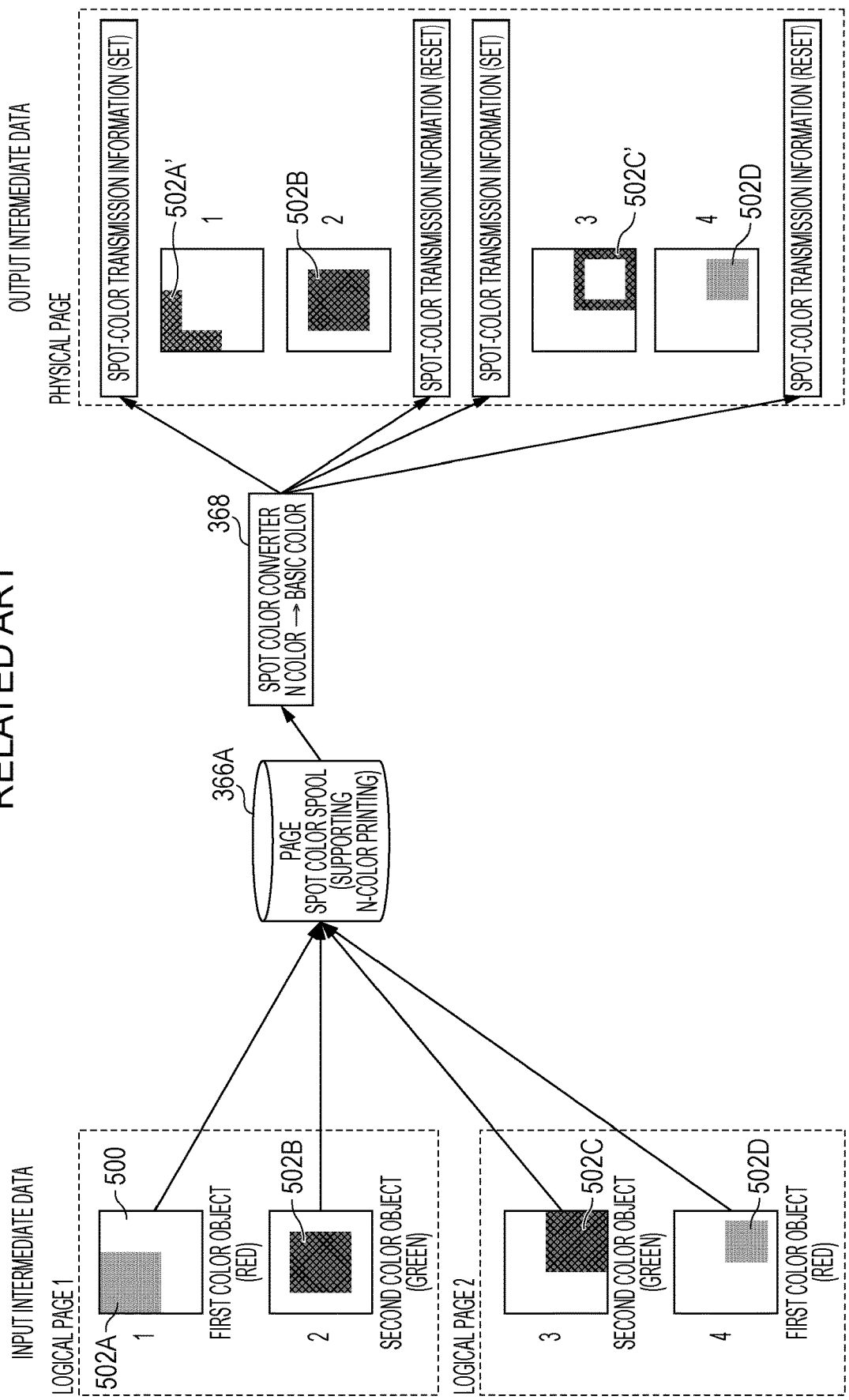
FIG. 14 illustrates an example of processing executed by the spot color flattener to discuss an issue of the related art.

FIG. 14 illustrates a specific example of processing executed by the spot color flattener 36. In this example, page intermediate data of the logical page 1 and that of the logical page 2 indicated on the left side of FIG. 14 are input into the spot color flattener 36. The logical page 1 includes a first color object 502A and a second color object 502B within a page region 500 in this order. The first color object 502A has a first color, while the second color object 502B has a second color. The logical page 2 includes a second color object 502C and a first color object 502D within the page region 500 in this order.

The spot color flattener 36 inputs the first object in the logical page 1, that is, the first color object 502A, into a page spot color spool 366A. Then, the second object in the logical page 1, that is, the second color object 502B, is input into the spot color flattener 36. In the second color object 502B, knockout processing is specified. The spot color flattener 36 thus causes the second color object 502B to eclipse the object of the logical page 1 currently stored in the page spot color spool 366A, that is, the first color object 502A. As a result, the first color object 502A is changed into an object 502A' in an inverted L shape. Then, the spot color flattener 36 inputs the second color object 502B into the page spot color spool 366A. The logical page 1 does not include any more object after the second color object 502B, and the second color object 502B in the page spot color spool 366A is not eclipsed.

Then, the second color object 502C and the first color object 502D within the logical page 2 are sequentially input into the spot color flattener 36. The spot color flattener 36 first inputs the second color object 502C into the page spot color spool 366A, and then causes the first color object 502D to eclipse the second color object 502C in the page spot color spool 366A. As a result, the second color object 502C is changed into an object 502C' in a hollow square-like shape. Then, the spot color flattener 36 inputs the first color object 502D into the page spot color spool 366A. The logical page 2 does not include any more object after the first color object 502D, and the first color object 502D in the page spot color spool 366A is not eclipsed.

After storing all the objects in the logical pages 1 and 2 to be arranged on one physical page by imposition in the page spot color spool 366A, the spot color flattener 36 outputs the stored object group to the back-end device 40. As indicated by the dotted-line portion "output intermediate data" on the right side of FIG. 14, the spot color flattener 36 outputs spot-color transmission information (set), the first color object 502A', and the second color object 502B of the logical page 1 in this order. Color data of the spot color of the first color object 502A' and that of the second color object 502B have been converted into that of basic colors in the spot color converter 368. Basic color representation of the spot color red is (C, M, Y, K)=(0, 1, 1, 0), for example, and that of the spot color green is (C, M, Y, K)=(1, 0, 1, 0), for example. The spot color flattener 36 then outputs spot-color transmission information (reset). Thereafter, the spot color flattener 36 outputs spot-color transmission information (set), the second color object 502C', and the first color object 502D of the logical page 2 in this order. Color data of the spot color of the second color object 502C' and that of the first color object 502D have been converted into that of basic colors in the spot color converter 368. The spot color flattener 36 then outputs spot-color transmission information (reset).

A description will be given, with reference to FIGS. 15A and 15B, of different stages of rendering processing executed in the renderer 44 when the objects in the dotted-line portion "output intermediate data" on the right side of FIG. 14 are sequentially input into the renderer 44. At the stage in which the objects are input into the renderer 44, they all have been converted into color data of basic colors.

At the stage in FIG. 15A, upon input of the spot-color transmission information (set), the renderer 44 sets the transmission ratio indicated by this information. Upon input of the first color object 502A', the renderer 44 draws an image of the first color object 502A' in a page memory 540 by using the transmission ratio. The page memory 540 is used for storing image data on a physical page.

The renderer 44 then draws an image of the second color object 502B in the page memory 540 by using the transmission ratio. The first color object 502A' has been eclipsed by the second color object 502B and does not overlap the second color object 502B. After the image of the second color object 502B is drawn in the page memory 540, the color of the second color object 502B is not superimposed on that of the first color object 502A'. The renderer 44 then resets the transmission ratio by using the spot-color transmission information (reset) and completes processing for the logical page 1.

At the stage in FIG. 15B, the object group in the logical page 2 is input. The renderer 44 sets the transmission ratio indicated by spot-color transmission information (set) for the logical page 2. The renderer 44 then draws an image of the second color object 502C' in the page memory 540 by using the transmission ratio. Eclipse processing is not applied to objects between different logical pages, and the second color object 502C' partially overlaps the second color object 502B in the logical page 1. The color of this overlapping portion becomes darker because the same second color is superimposed on each other by using the transmission ratio. The renderer 44 then draws an image of the first color object 502D in the page memory 540 by using the transmission ratio. The second color object 502C' has been eclipsed by the first color object 502D in the same logical page 2, but the objects of the logical page 1 have not been eclipsed by the first color object 502D. The second color object 502B of the logical page 1 partially overlaps the first color object 502D. The color of this overlapping portion becomes a superimposed color of the first color on the second color by using the transmission ratio.

As described above, when spot color simulations in two-color printing using two different spot colors are conducted by mere eclipse processing between spot color components of objects within the same logical page, a superimposing portion of the spot color components, which makes the spot color dark, is found in the resulting drawn image.

In a fourth exemplary embodiment, to address such an issue, KO masks discussed in the first through third exemplary embodiments are used.

Figure 16:
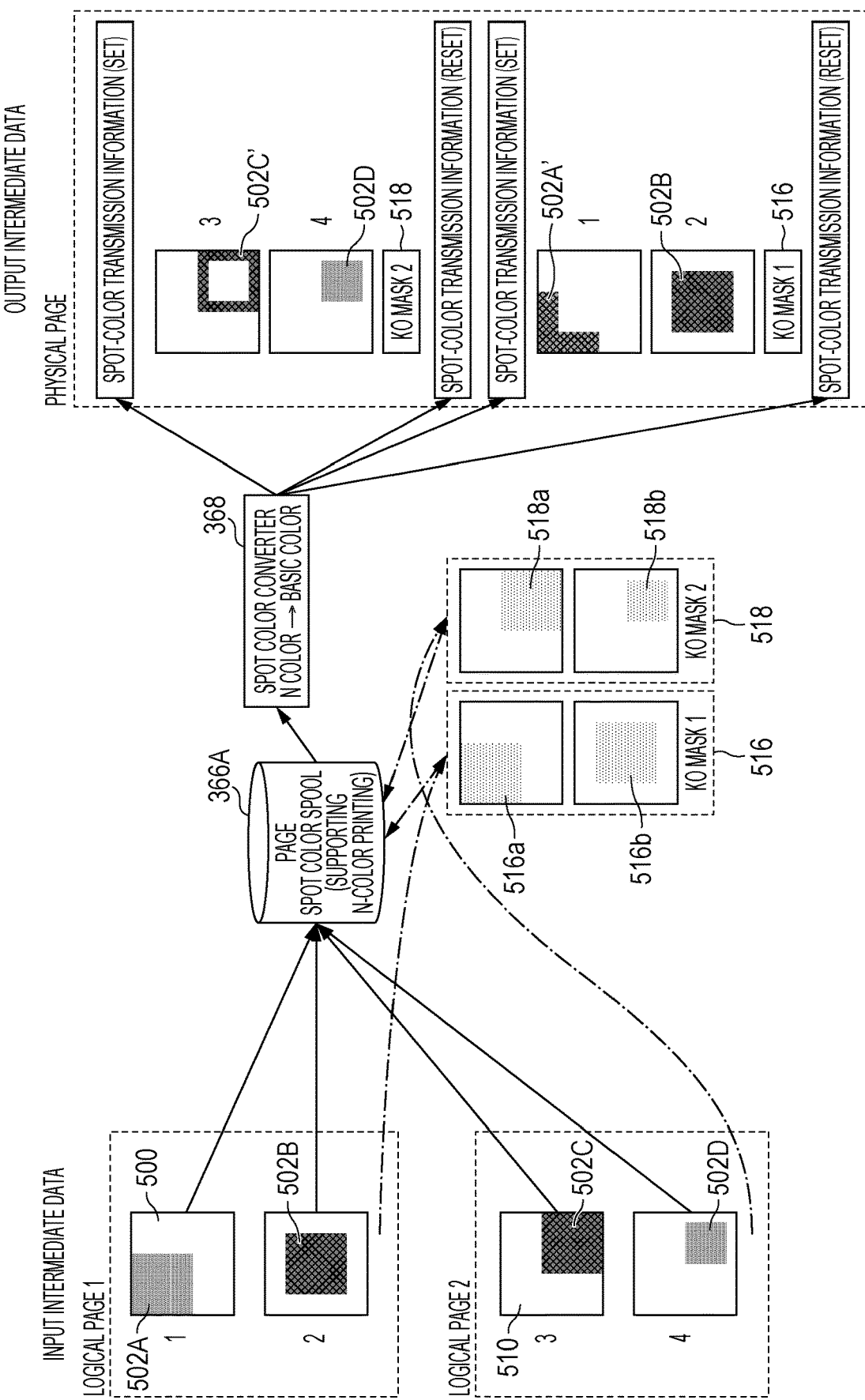
FIG. 16 illustrates an example of processing executed by the spot color flattener according to a fourth exemplary embodiment.

FIG. 16 illustrates a specific example of processing executed by the spot color flattener 36. In this example, the same objects in the logical pages 1 and 2 as those in FIG. 14 are sequentially input into the spot color flattener 36.

The spot color flattener 36 processes the objects starting from the first color object 502A of the logical page 1 similarly to processing in FIG. 14. Upon detecting that processing has reached the end of the logical page 1, the spot color flattener 36 generates KO masks 516a and 516b representing the shapes of the corresponding objects in the logical page 1. The KO masks 516a and 516b are objects in the intermediate data format. The spot color flattener 36 then inputs a set of the KO masks 516a and 516b into the page spot color spool 366A as a KO mask 1 set 516.

The spot color flattener 36 then processes the objects in the logical page 2. Upon detecting that processing has reached the end of the logical page 2, the spot color flattener 36 generates KO masks 518a and 518b representing the shapes of the corresponding objects in the logical page 2. The spot color flattener 36 then inputs a set of the KO masks 518a and 518b into the page spot color spool 366A as a KO mask 2 set 518.

As a result of the above-described processing, when the logical pages 1 and 2 to be included in a certain physical page have been processed, an object group within the logical page 1 (first color object 502A', second color object 502B, and KO mask 1 set 516) and an object group within the logical page 2 (second color object 502C', first color object 502D, and KO mask 2 set 518) are stored in the page spot color spool 366A in this order.

When processing has reached the end of the physical page, the spot color flattener 36 outputs the object groups in the page spot color spool 366A to the spot-color intermediate data buffer 42-2 in reverse order of the order in which they are arranged on the physical page.

More specifically, the spot color flattener 36 first outputs spot-color transmission information (set), which will be applied to the logical page 2, to the spot-color intermediate data buffer 42-2. The spot color flattener 36 then sequentially outputs the second color object 502C', the first color object 502D, the KO mask 2 set 518, and spot-color transmission information (reset). Thereafter, the spot color flattener 36 outputs spot-color transmission information (set), which will be applied to the logical page 1, to the spot-color intermediate data buffer 42-2. The spot color flattener 36 then sequentially outputs the first color object 502A', the second color object 502B, the KO mask 1 set 516, and spot-color transmission information (reset). In this manner, the objects in the dotted-line portion "output intermediate data" on the right side of FIG. 16 are sequentially output from the spot color flattener 36 in the top-bottom direction.

A description will be given, with reference to FIGS. 17A and 17B, of different stages of rendering processing executed in the renderer 44 when the objects in the dotted-line portion "output intermediate data" on the right side of FIG. 16 are sequentially input into the renderer 44.

At the stage in FIG. 17A, the renderer 44 sets the transmission ratio indicated by the spot-color transmission information (set) for the logical page 2, which is input into the renderer 44 first. The renderer 44 then draws an image of the second color object 502C' in the page memory 540 by using the transmission ratio. The renderer 44 then draws an image of the first color object 502D in the page memory 540 by using the transmission ratio. The second color object 502C' is eclipsed by the first color object 502D, and thus, the colors of these objects are not superimposed on each other.

Then, the KO mask 2 set 518 is input into the renderer 44. The renderer 44 stores the two KO masks 518a and 518b included in the KO mask 2 set 518 in the mask memory 443 (see FIG. 9).

The renderer 44 resets the transmission ratio by using the spot-color transmission information (reset) and completes processing for the logical page 2.

At the stage in FIG. 17B, the renderer 44 sets the transmission ratio indicated by the spot-color transmission information (set) for the logical page 1. The renderer 44 then applies the KO masks 518a and 518b in the mask memory 443 to the first color object 502A' of the logical page 1. Then, the renderer 44 draws an image of the masked first color object 502A' in the page memory 540 by using the transmission ratio. The first color object 502A' does not overlap the KO masks 518a and 518b and is not masked by these masks.

The renderer 44 then masks the second color object 502B with the KO masks 518a and 518b in the mask memory 443. As a result, the overlapping portion between the second color object 502B and the KO masks 518a and 518b, that is, between the second color object 502C' and the first color object 502D of the logical page 2, is removed from the second color object 502B. The renderer 44 then draws an image of the masked second color object 502B in the page memory 540. The masked second color object 502B overlaps neither of the second color object 502C' nor the first color object 502D of the logical page 2. Thus, a superimposed portion of the spot color components between the logical page 1 and the logical page 2, which makes the spot color dark, is not found in the resulting image.

The above-described front-end device 30 and back-end device 40 may be implemented as a result of causing a computer to execute a program which describes the above-described functions. The computer has the following hardware circuit configuration. A microprocessor, such as a CPU, memory devices (primary storage devices), such as a random access memory (RAM) and a read only memory (ROM), a controller for controlling solid-state storage devices, such as a flash memory, a solid state drive (SSD), and a hard disk drive (HDD), various input-output (IO) interfaces, and a network interface for controlling connection with a network, such as a LAN, are connected to one another via a bus, for example. A program describing the processing content of the above-described functions is stored in a solid-state storage device, such as a flash memory, and is installed into the computer via a network. As a result of the microprocessor, such as a CPU, reading the program stored in the solid-state storage device into the RAM and executing the program, the above-described functional modules are implemented.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing system comprising:
a first device that converts print data described in a page description language into intermediate data; and
a second device that converts the intermediate data into raster data and supplies the raster data to a printer,
the first device including
a shape modifier that divides a plurality of graphic elements indicated by the intermediate data within a unit of output into groups, and that modifies, among the graphic elements in each of the groups, a shape of first-type graphic elements having a specific component into a shape without having an overlapping portion between the first-type graphic elements, a color of the specific component being superimposed on a color of an underlying graphic element,
a first generator that generates an item of mask information for identifying a logical OR shape of the first-type graphic elements included in each of the groups, and
an output section that outputs the plurality of graphic elements, and outputs the first-type graphic elements having the modified shape in each of the groups so that the first-type graphic elements in the individual groups are output, together with the associated items of mask information, in reverse order of an order in which the individual groups are arranged within the unit of output,
the second device including
a mask storage that stores the items of mask information,
a graphic storage that stores a graphic of the unit of output, and
a renderer that adds, upon receiving an item of the mask information from the output section, the item of the mask information to the mask storage and that masks, upon receiving a first-type graphic element from the output section, the first-type graphic element with the logical OR shape identified by the items of mask information stored in the mask storage and then writes a graphic of the masked first-type graphic element into the graphic storage.

2. The image processing system according to claim 1, wherein:
the first generator generates, as an item of the mask information, a single mask shape representing the logical OR shape of the first-type graphic elements included in each of the groups; and
upon receiving a first-type graphic element from the output section, the renderer masks the first-type graphic element with the single mask shape represented by the item of mask information stored in the mask storage, and writes a graphic of the masked first-type graphic element into the graphic storage.

3. The image processing system according to claim 1, wherein:
the first generator generates, as an item of the mask information, a set of individual mask shapes representing the shapes of the corresponding first-type graphic elements included in each of the groups; and
upon receiving a first-type graphic element from the output section, the renderer masks the first-type graphic element with the logical OR shape of the individual mask shapes represented by the item of mask information stored in the mask storage, and writes a graphic of the masked first-type graphic element into the graphic storage.

4. The image processing system according to claim 1, wherein:
the plurality of graphic elements within the unit of output include a reference element that references a set of external first-type graphic elements outside the unit of output;
the shape modifier divides the plurality of graphic elements into groups by using the reference element as a divider; and
if the graphic element received from the output section is the reference element, the renderer obtains the set of external first-type graphic elements to be referenced by the reference element, masks the external first-type graphic elements with the logical OR shape identified by the items of mask information stored in the mask storage, and writes a graphic of the masked external first-type graphic elements into the graphic storage.

5. The image processing system according to claim 2, wherein:
the plurality of graphic elements within the unit of output include a reference element that references a set of external first-type graphic elements outside the unit of output;
the shape modifier divides the plurality of graphic elements into groups by using the reference element as a divider; and
if the graphic element received from the output section is the reference element, the renderer obtains the set of external first-type graphic elements to be referenced by the reference element, masks the external first-type graphic elements with the logical OR shape identified by the items of mask information stored in the mask storage, and writes a graphic of the masked external first-type graphic elements into the graphic storage.

6. The image processing system according to claim 3, wherein:
the plurality of graphic elements within the unit of output include a reference element that references a set of external first-type graphic elements outside the unit of output;
the shape modifier divides the plurality of graphic elements into groups by using the reference element as a divider; and
if the graphic element received from the output section is the reference element, the renderer obtains the set of external first-type graphic elements to be referenced by the reference element, masks the external first-type graphic elements with the logical OR shape identified by the items of mask information stored in the mask storage, and writes a graphic of the masked external first-type graphic elements into the graphic storage.

7. The image processing system according to claim 1, wherein:
the unit of output is one physical page on which a plurality of logical pages are arranged by imposition; and
the shape modifier divides the plurality of graphic elements into groups so that each group includes the first-type graphic elements in a corresponding logical page.

8. The image processing system according to claim 7, further comprising:
a second generator that generates, from the graphic elements included in each of the logical pages, shape information representing a shape of the graphic elements which include the specific component but do not include any other components, wherein after outputting a graphic element having a component other than the specific component in each of the logical pages, the output section outputs the shape information concerning a corresponding logical page, and upon receiving the shape information from the output section, the renderer masks, within a shape of a graphic written into the graphic storage, a shape corresponding to the shape represented by the shape information.

9. An image processing system comprising:

a first device that converts print data described in a page description language into intermediate data; and a second device that converts the intermediate data into raster data and supplies the raster data to a printer, the first device including shape modifier means for dividing a plurality of graphic elements indicated by the intermediate data within a unit of output into groups, and for modifying, among the graphic elements in each of the groups, a shape of first-type graphic elements having a specific component into a shape without having an overlapping portion between the first-type graphic elements, a color of the specific component being superimposed on a color of an underlying graphic element, first generating means for generating an item of mask information for identifying a logical OR shape of the first-type graphic elements included in each of the groups, and outputting means for outputting the plurality of graphic elements, and outputting the first-type graphic elements having the modified shape in each of the groups so that the first-type graphic elements in the individual groups are output, together with the associated items of mask information, in reverse order of an order in which the individual groups are arranged within the unit of output, the second device including mask storage means for storing the items of mask information, graphic storage means for storing a graphic of the unit of output, and rendering means for adding, upon receiving an item of the mask information from the outputting means, the item of the mask information to the mask storage means and for masking, upon receiving a first-type graphic element from the outputting means, the first-type graphic element with the logical OR shape identified by the items of mask information stored in the mask storage means and then writing a graphic of the masked first-type graphic element into the graphic storage means.

* * * * *